United States Patent [19]
Minamoto

[11] Patent Number: 6,108,118
[45] Date of Patent: Aug. 22, 2000

[54] OPTICAL DEFLECTOR

[75] Inventor: Yukiaki Minamoto, Hachioji, Japan

[73] Assignee: Olympus Optical Co., Ltd., Tokyo, Japan

[21] Appl. No.: 09/349,222

[22] Filed: Jul. 7, 1999

[30] Foreign Application Priority Data

Jul. 9, 1998 [JP] Japan .................................. 10-194312

[51] Int. Cl.$^7$ ................................................. G02B 26/08
[52] U.S. Cl. ............................ 359/224; 359/196; 310/36
[58] Field of Search .................... 359/196, 223, 359/224, 198; 310/36

[56] References Cited

U.S. PATENT DOCUMENTS

| | | | |
|---|---|---|---|
| 4,560,925 | 12/1985 | Niven et al. | 359/221 |
| 5,243,241 | 9/1993 | Wang | 310/36 |
| 5,280,377 | 1/1994 | Chandler et al. | 359/196 |

FOREIGN PATENT DOCUMENTS

| | | |
|---|---|---|
| 64-2015 | 1/1989 | Japan . |
| 10-90625 | 4/1998 | Japan . |

*Primary Examiner*—Darren E. Schuberg
*Attorney, Agent, or Firm*—Frishauf, Holtz, Goodman, Langer & Chick, P.C.

[57] ABSTRACT

An optical deflector has a support. A movable plate is formed with a mirror for reflecting light from a light source. The mirror is formed on at least one surface of the movable plate. An elastic member couples the movable plate and the support to hold the movable plate in a deflectable manner. A driving coil is formed on at least one surface of the movable plate. A magnetic field producing means produces a magnetic field in a direction substantially parallel to the surface of the movable plate. The interaction between a current flow in the driving coil and a magnetic field produced by the magnetic field producing means causes elastic deformation of the elastic member, which, in turn, deflects the movable plate. A Hall element detects the deflection angle of deflection motion of the movable plate.

11 Claims, 20 Drawing Sheets

OPTICAL DEFLECTOR

BACKGROUND OF THE INVENTION

The present invention relates to an optical deflector which reflects light from a light source and scans the reflected light.

Japanese Unexamined Patent Publication No. 64-2015 discloses an example of a conventional optical deflector the arrangement of which is illustrated in FIGS. 21A and 21B. FIG. 21A is a perspective view of the optical deflector and FIG. 21B is a cross-sectional view. In these figures, 1 denotes a movable plate having a reflecting means on its one surface, 2 denotes a hinge member of torsion bar type formed of a metal planar plate, 3 denotes a support member fixing both ends of the hinge member 2, 40 denotes a magnet, 6 denotes a first coil fixed to the hinge member 2 to face the magnetic poles of the magnet 40, 8 denotes a second coil fixed to the first coil, 9 denotes a yoke having a magnetic gap where the first coil 6 and the second coil 8 are positioned and forming a closed magnetic circuit, and 10 denotes a third coil fixed to the yoke 9 in the vicinity of the first coil 6.

In the optical deflector thus arranged, when an AC current is applied to the first coil 6, interaction between the current in the first coil 6 and a magnetic field produced by the magnet 40 exerts a Lorentz force on the first coil 6 in the direction of thickness of the movable plate 1. As a result, the movable plate 1 is rotated with its rotation center being the direction parallel to the movable plate plane in the hinge member 2.

The second coil 8 that rotates simultaneously with the movable plate 1 cuts the flux of a magnetic field produced from the magnet 40 and an induced electromotive force is produced across the second coil which is proportional to the rate at which the flux is cut. In addition to the induced electromotive force, an electromotive force is produced in the second coil 8 by mutual induction associated with the varying current in the first coil 6. This is the case with the third coil 10. To reduce the induced electromotive force produced in the second coil 8 by mutual induction, the difference in induced electromotive force due to the varying current in the first coil 6 between the second and third coils 8 and 10 is subjected to negative feedback to the first coil 6. The induced electromotive force produced in the second coil 8 which has the induced electromotive force associated with the varying current in the first coil 6 reduced in that manner serves as the velocity signal of the movable plate 1 and the second and third coils 8 and 10 function as means for controlling the light deflecting angle of the movable plate 1. With this optical deflector, laser light is directed to the movable plate 1, allowing reflected light to be scanned.

Japanese Unexamined Patent Publication No. 10-90625 describes another example of a conventional optical deflector.

FIG. 22 shows the planar configuration of this optical deflector, which comprises a movable plate 21, an elastic member 22, a support member 23, a driving coil 24, a sensing coil 25, driving coil electrode pads 26, sensing coil electrode pads 27, and a permanent magnet 28. Here, the movable plate 21, the elastic member 22, the support member 23, the driving coil 24 and the sensing coil 25 are integrally formed by means of semiconductor manufacturing techniques. The movable plate 21, which is formed mainly from a Si substrate of a high-stiffness material, is formed on its one side with the coils 24 and 25 and has a reflective planar surface as reflecting means on its opposite side.

The elastic member 22, which is formed mainly from an organic material such as polyimide, supports the movable plate 21 so that it can move in the direction of thickness. The support member 23, formed from the same substrate as the movable plate 21, fixes the elastic member 22. The driving coil 24 and the sensing coil 25 are made mainly from a metal such as Al, Cu, or the like and have two or more turns formed in as outside a portion of the movable plate 21 as possible. Both the driving coil and the sensing coil are placed almost vertically with respect to each other and an insulating layer is formed between the coils, thus providing isolation between the coils. The driving coil electrode pads 26 and the sensing coil electrode pads 27 are formed on the support member 23. The coils both pass through the elastic member 22 and terminate at the support member 23. The permanent magnet 28 is magnetized perpendicular to the direction of current flow in that portion of the driving coil 24 which is opposed to the magnet. To increase the driving force and to increase the output level of the detected signal, the magnet is placed in the vicinity of the movable plate 21, the driving coil 24, and the sensing coil 25.

In the optical deflector thus arranged, when an AC current is applied to the driving coil 24, interaction between the current in the driving coil 24 and a magnetic field produced by the magnet 28 exerts the Lorentz force on the driving coil 24 in the direction of thickness of the movable plate 21. The Lorentz force causes the movable plate 21 to set up both a translational motion in the direction of its thickness with the boundary between the elastic member 22 and the support member 23 as the fixed end and a rotating motion in the direction of its direction with an axis of the elastic member 22 in the thickness in which the magnet 28 is magnetized as the axis of rotation. The sensing coil 25 that translates and rotates simultaneously with the movable plate 21 cuts a magnetic flux produced by the permanent magnet 28 with the result that an induced electromotive force is produced across the sensing coil 25 which is proportional to the rate at which the sensing coil 25 cuts the magnetic flux. The induced electromotive force produced in the sensing coil 25 is used as a velocity signal of the movable plate 21 and the sensing coil 25 is used as means for controlling the angle of rotation of the rotatable pate 21. This optical deflector can scan the reflected light, which is obtained by irradiating light, such as laser light to the plate 21 that is translating and rotating.

However, since the signal of the sensing coil as detecting means used in the conventional techniques is a velocity signal, the position of the movable plate is not detected precisely. The integration of the velocity signal would produce a position signal, which however, might deviate from the precise position of the movable plate. In particular, when the frequency of driving current in the driving coil is low, the signal produced is very small in magnitude; thus, there is the strong possibility that the integrated signal may differ from the displacement signal of the movable plate. Further, with DC current applied, precise detection is difficult. Thus, when the movable plate is used as positioning means, such driving coil-based detect means as used in the conventional techniques cannot be used.

There is a method by which an elastic member is formed with a strain gauge made of a piezoresistive element and a signal is detected through bending and torsion of the elastic member. However, the deformation of the elastic member does not necessarily correspond to the displacement of the movable plate.

BRIEF SUMMARY OF THE INVENTION

It is therefore an object of the present invention to provide an optical deflector which allows the position of a movable plate to be detected with higher precision and sensitivity than is possible with the conventional techniques and moreover the position of the movable plate to be detected precisely even when it is driven by a low-frequency or direct-current signal.

To attain the object, an optical deflector comprising: a support; a movable plate formed with a mirror for reflecting light from a light source, the mirror being formed on at least one surface of the movable plate; an elastic member coupling the movable plate and the support and holding the movable plate so that it can deflect; a driving coil formed on at least one surface of the movable plate; magnetic field producing means for producing a magnetic field in a direction substantially parallel to the surface of the movable plate; and a Hall element for detecting the deflection angle of the deflection motion of the movable plate which occurs when interaction between a current in the driving coil and a magnetic field produced by the magnetic field producing means causes elastic deformation of the elastic member.

DETAILED DESCRIPTION OF THE INVENTION

Hereinafter, the preferred embodiments of the present invention will be described with reference to the accompanying drawings. The common feature of the embodiments of the present invention is that a Hall element or elements are formed on a rotatable element. Therefore, the operating principle of the Hall element will be described first for better understanding of the present invention.

Figure 1:
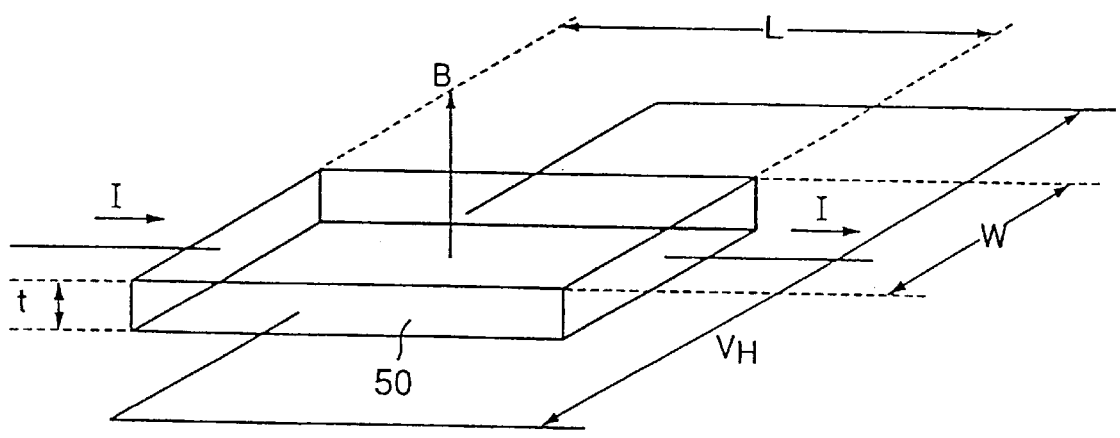
FIG. 1 is a diagram for use in explanation of the operating principle of a Hall element.
Figure 1:
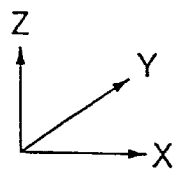

As shown in FIG. 1, when a current I is applied to a rectangular, thin semiconductor plate 50 and a magnetic flux density B is imposed in a direction (Z-direction) perpendicular to the current I, a Lorentz force is produced by interaction between the current I and the magnetic flux density B in a direction (Y-direction) orthogonal to both the X-direction and the Z-direction. Electrons in the current I are bent by the Lorentz force in the Y-direction perpendicular to both the current I and the magnetic flux density B, producing an electromotive force $V_H$ in the Y-direction. $V_H$ is referred to as the Hall voltage, which is given by $$V_H = R_H \cdot I \cdot B / t \qquad (1)$$

where $R_H$ is the Hall coefficient and t is the thickness of the thin plate. In an n-type semiconductor, the Hall coefficient is given by $$R_H = -1/n\ e$$

and in a p-type semiconductor, $$R_H = 1/p\ e$$

where n and p are the electron and hole concentrations, respectively, and e is the unit electric charge of an electron.

Figure 2A:
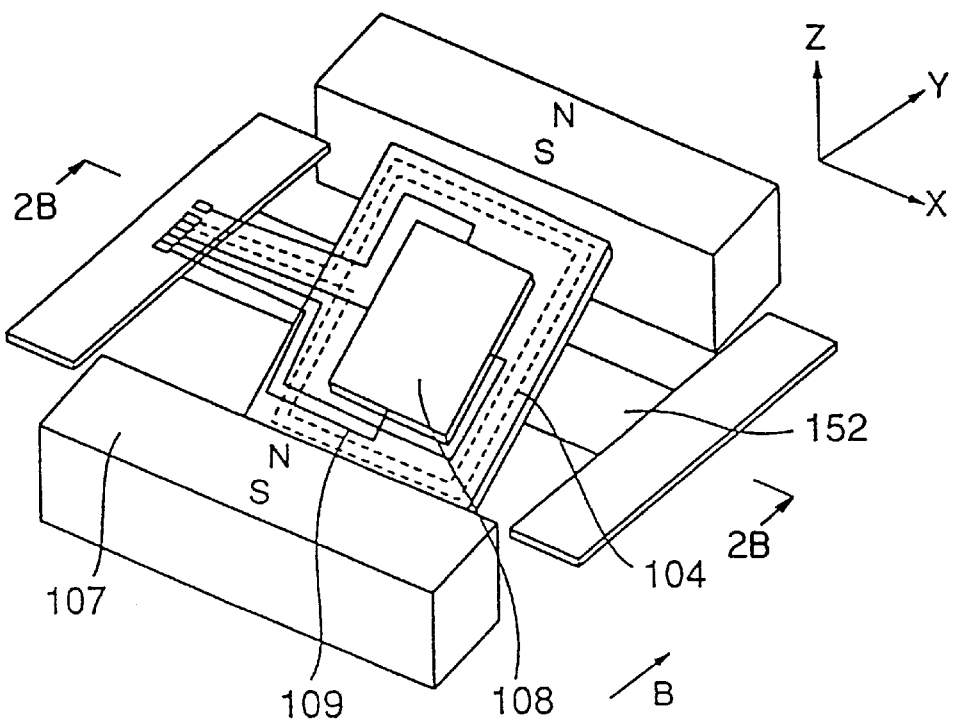
FIG. 2A is a perspective view of an optical deflector according to a first embodiment of the present invention in which a Hall element is attached to a movable plate.
Figure 2B:
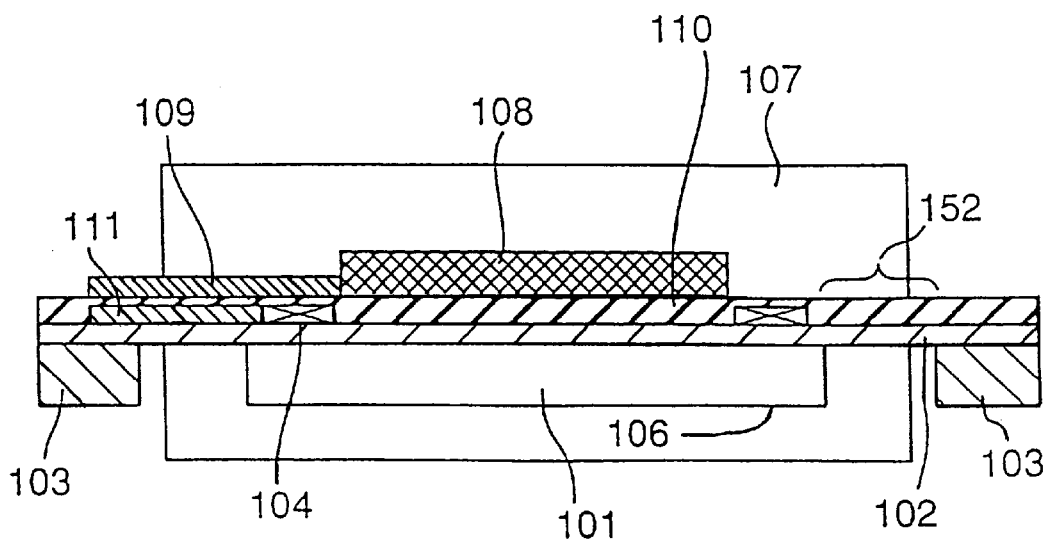
FIG. 2B is a sectional view of the optical deflector taken along line 2B—2B of FIG. 2A.

Next, a first embodiment of the present invention will be described, which is characterized in that a Hall element is attached to a movable plate. FIG. 2A is a perspective view of the optical deflector according to the first embodiment of the present invention and FIG. 2B is a sectional view taken along line 2B—2B of FIG. 2A. The optical deflector of the first embodiment is composed of a support 103, a movable plate 101 formed on its one surface with a mirror surface 106 for reflecting light from a light source, an elastic member 102 for coupling the movable plate 101 with the support 103 and holding the movable plate 101 rotatably, a driving coil 104 formed on the other surface of the movable plate 101, a coil wiring 111 for the driving coil 104, a permanent magnet 107 serving as a magnetic field producing means for producing a magnetic field in a direction substantially parallel to the surface of the movable plate 101, a Hall element 108 attached to the movable plate 101 on the inside of the driving coil 104, a Hall element wiring 109 for the Hall element 108, and an insulating film 110 that covers the driving coil 104. The elastic member 102 is a torsion bar structure. In this embodiment, other components than the permanent magnet 108, the Hall element 108, and the Hall element wiring 109 are formed integral with one another in a monolithic form.

It is preferable that the movable plate 101 and the support 103 be mainly made of a high-stiffness material such as silicon. It is preferable that the elastic member 102 be mainly made of an organic material, such as polyimide, that has a long life and allows for a large angle of deflection. The driving coil 104 is preferably made of a low-resistivity metal, such as Al, Cu, or the like. To increase the driving force of the movable plate 101 to thereby make large the angle of deflection, it is preferable that the driving coil 104 have many turns with as low resistance as possible and be placed as close to the permanent magnet 107 as possible, that is, as close to the edge of the movable plate as possible. If the movable plate 101 is an Si substrate, then the mirror 106 may be formed of the polished surface of the substrate or a thin coating of aluminum or gold formed on the substrate. The permanent magnets 107 are positioned in close proximity to the movable plate 101 so as to be opposite the motional ends of the movable plate. The permanent magnets 107 are magnetized in the Y-direction in FIG. 2A and placed so that their magnetic poles of opposite types are opposed to each other with the movable plate interposed therebetween. The Hall element 108, while being situated on the inside of the driving coil 104 on the movable plate in FIG. 2A, may be overlapped with the driving coil 104 in its thickness direction provided that the Hall element wiring 109 can be formed.

In the optical deflector thus arranged, when an AC current is applied to the driving coil 104, interaction between the current flowing in the X-direction in the driving coil 104 and a magnetic field produced by the magnets 107 exerts a Lorentz force on the driving coil 104 in the Z-direction. The movable plate 101 experiences the Lorentz force and rotates on an axis of the elastic member 102 in the X-direction. The optical deflector of this embodiment is arranged such that the mirror 106 of the movable plate 101 is irradiated with light, such as a laser beam, and the movable plate 101 is rotated in the above manner to thereby scan the reflected light.

Figure 3A:
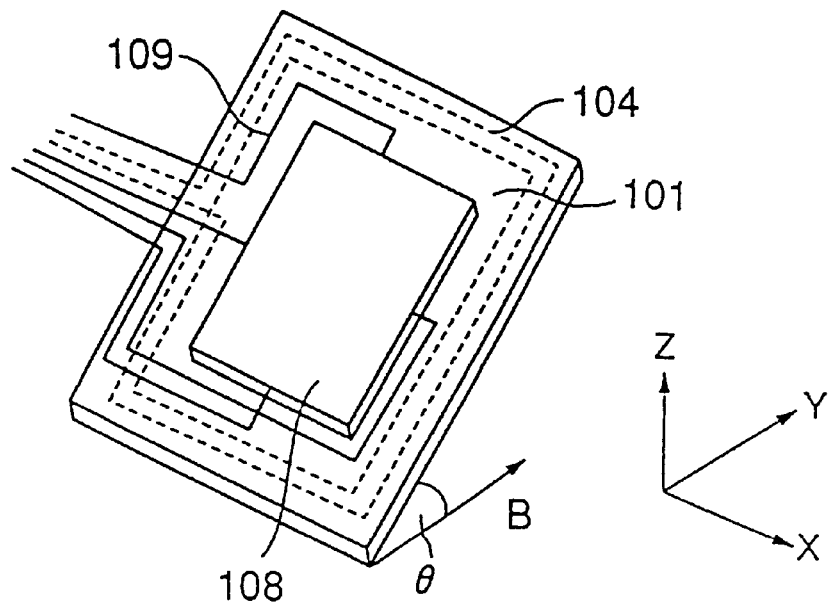
FIGS. 3A and 3B are diagrams for use in explanation of the operation of the optical deflector of FIGS. 2A and 2B.
Figure 3B:
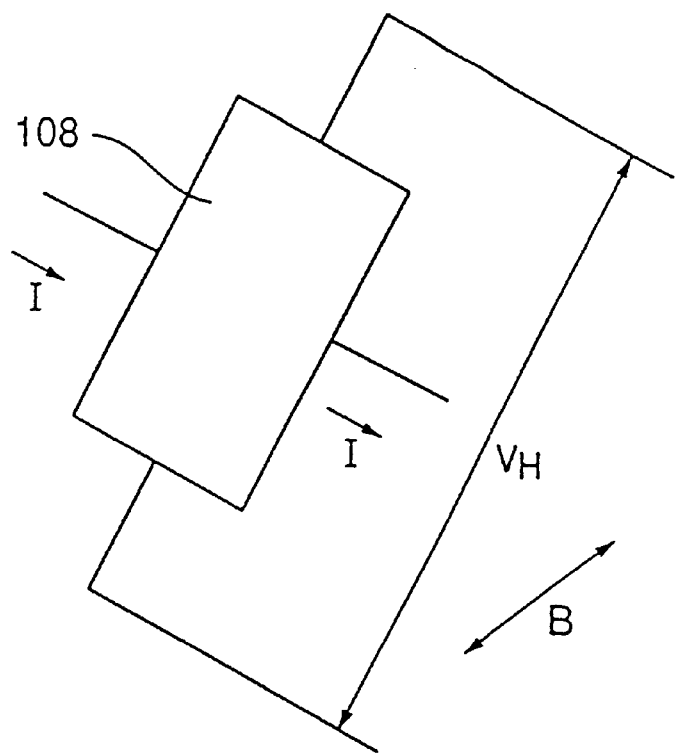

FIGS. 3A and 3B show the state of the movable plate 101 tilted by angle θ to its neutral position. The figures show only the movable plate, coil, and the Hall element and its wiring, and such elements as the elastic member are omitted (the same is true of FIGS. 4A to 9A, FIG. 10, and FIGS. 11A to 14A). The magnetic flux density component in the direction of thickness of the Hall element 108 is B·sin θ. When a current I is made to flow between the Hall element 108 terminals in the X-direction, a Hall voltage is produced between the Hall element terminals in the Y-direction in accordance with equation (1), which is represented by $$V_H = R_H \cdot I \cdot B \cdot \sin\theta / t \tag{2}$$

Thus, using the same Hall element and assuming that the applied current I and magnetic flux density B are fixed, the Hall voltage depends on the deflection angle of the movable plate 101 and hence serves as a position signal representing the position of the movable plate 101.

The Hall element 108 is preferably made of a material, such as InSb, InAs, GaAs, or the like, that has a large carrier mobility. Depending on the material used and the shape, the Hall element generally produces a Hall voltage of hundreds of millivolts even in the case of an applied current of some milliamperes and a magnetic flux density of hundreds of gausses.

On the other hand, the magnitude of a signal produced in the sensing coil in the conventional technique is in the range of tens to hundreds of microvolts when the applied current is low in frequency. In this embodiment, therefore, the detection sensitivity is much higher than in the conventional technique. In addition, since the detected signal is a position signal, the position of the movable plate is detected more accurately than in the conventional technique. Moreover, precise detection is possible even in a static state when a DC current is applied to the driving coil.

The detection is also possible even when the applied current and the detected voltage are reversed in their direction in FIGS. 3A and 3B. Depending on the shape of the Hall element 108, however, the detection sensitivity varies, which will be described below.

Assuming that, in FIG. 1, the distance between the current terminals of the Hall element is L and the distance between the Hall voltage terminals is W, equation (1) can be rewritten as $$V_H = \mu \cdot V' \cdot B \cdot W/L \tag{3}$$

where V' is the voltage applied between the current terminals of the Hall element the spacing of which is L and μ is the carrier mobility. To increase the Hall voltage $V_H$, it is better to make small the carrier concentration (the electron concentration n or the hole concentration p) as is evident from equation (1). That is, in order to increase the resistance between the current terminals, it is desirable that the Hall element be shaped such that L>W; however, increasing the applied current I requires increasing the applied voltage V'.

On the other hand, when the Hall element is shaped such that L<W, equation (3) shows that, when the applied voltage and the carrier mobility are fixed, the Hall voltage increases as W/L increases; however, making the resistance between the current terminals too low results in reduced carrier mobility. In order to increase the detection sensitivity, therefore, it is desirable to increase W/L using the Hall element shape such that L>W to increase the resistance between the current terminals; however, limitations of applied voltage and power consumption should be taken into consideration.

Hereinafter, an example of a method of manufacturing the optical deflector using an Si substrate as the movable plate 101 will be described briefly. First, an insulating film, serving as a mask for subsequent etching of Si, is formed on one surface of an Si substrate by means of sputtering, CVD, vacuum evaporation, or the like and then patterned using photolithographic techniques. Next, an organic insulating film 102 is formed on the opposite surface of the Si substrate by means of spin coating, screen printing, or the like and then patterned. This organic insulating film 102 is formed not only on the movable plate 101 but also on the support 103, and patterned to the shape of the elastic member 152, as shown in FIG. 2B. After that, a metal film, the material of the driving coil 104, is formed by means of sputtering, CVD, vacuum evaporation, plating, screen printing, or the like and then patterned by means of photolithographic techniques. Next, an insulating film 110 is formed on the metal film to cover the driving coil 104 and patterned to the shape of the elastic member 152. The Si substrate is then etched using the first formed insulating film as a mask.

The steps thus far described are the manufacturing process prior to the formation of the Hall element 108. Thus, the movable plate 101, the elastic member 102, the support 103, the driving coil 104 and the mirror 106 can be formed on the same substrate in a monolithic form using semiconductor manufacturing techniques, allowing the device to be reduced in size and mass-produced with ease. Finally, the Hall element 108 is attached to the movable plate 101 on the inside of the driving coil 104 and the Hall element wiring 109 is also attached to the movable plate in such a way as to be electrically connected with the Hall element. As described previously, it is desirable to use a material, such as InSb, InAs, GaAs, or the like, that is large in carrier mobility as the Hall element 108. In the case of a Hall element using Si that is small in carrier mobility, the movable plate 101 can be equipped with a Hall IC into which such a processing circuit as amplifies a Hall voltage signal and a Hall element are integrally incorporated.

Figure 4A:
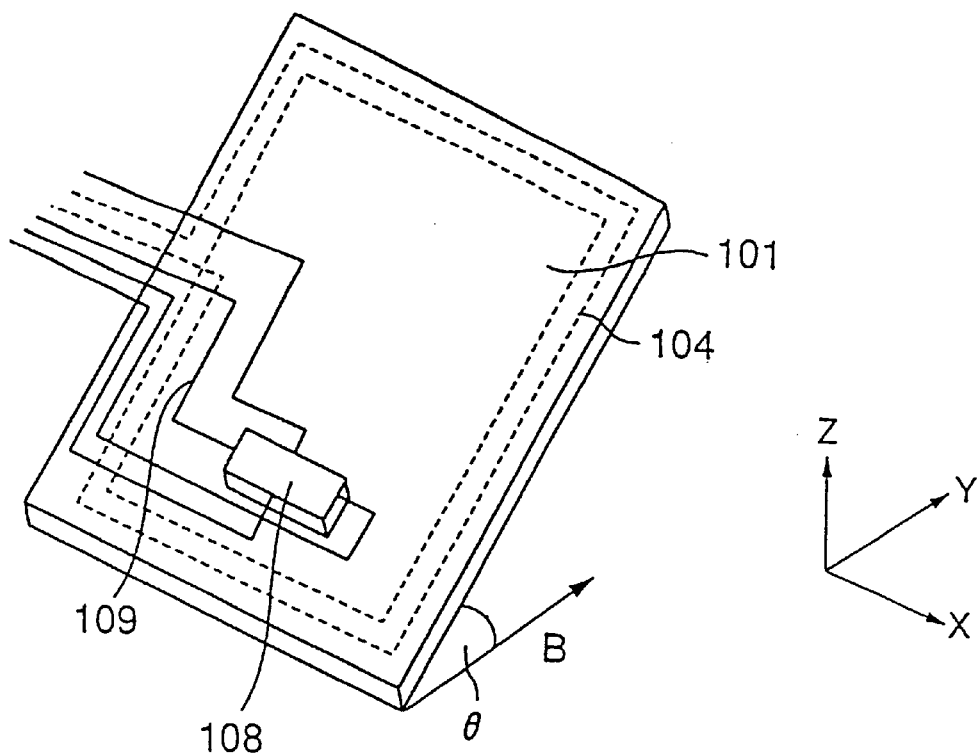
FIGS. 4A and 4B show a modification of the first embodiment in which a small Hall element is attached to a motional end of the movable plate.
Figure 4B:
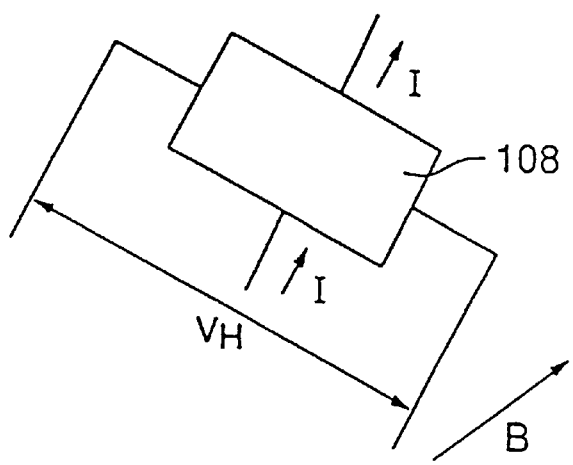

Although, as shown in FIGS. 2A, 2B, 3A, and 3B, a Hall element is attached to the entire inside of the driving coil, a small Hall element 108 may be attached to a motional end of the movable plate 101 as shown in FIGS. 4A and 4B. In this configuration, since the entire Hall element is placed closer to the permanent magnet, the magnetic flux density B in the direction of thickness of the Hall element increases. Thus, as evident from equation (2), the Hall voltage $V_H$ also increases, providing an optical deflector capable of detecting a position signal with higher sensitivity.

Figure 5A:
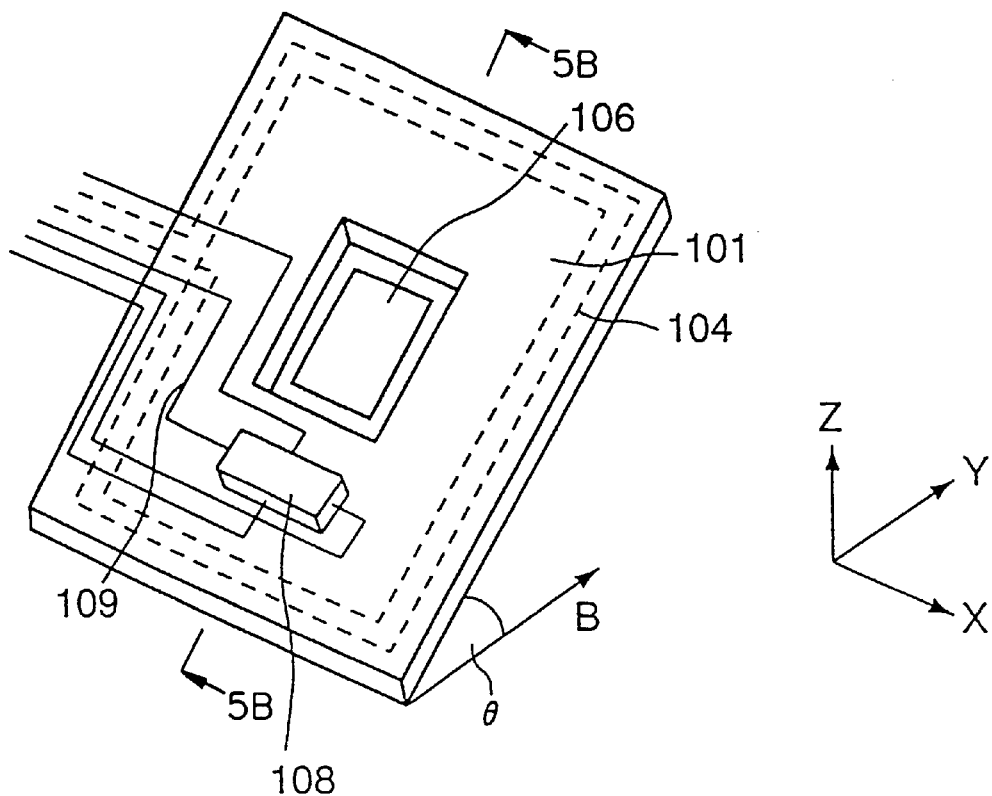
FIGS. 5A and 5B show an example of a structure wherein a Hall element is attached to a motional end of a movable plate in such a manner that a specular surface can be formed on the same side as a coil and the Hall element.
Figure 5B:
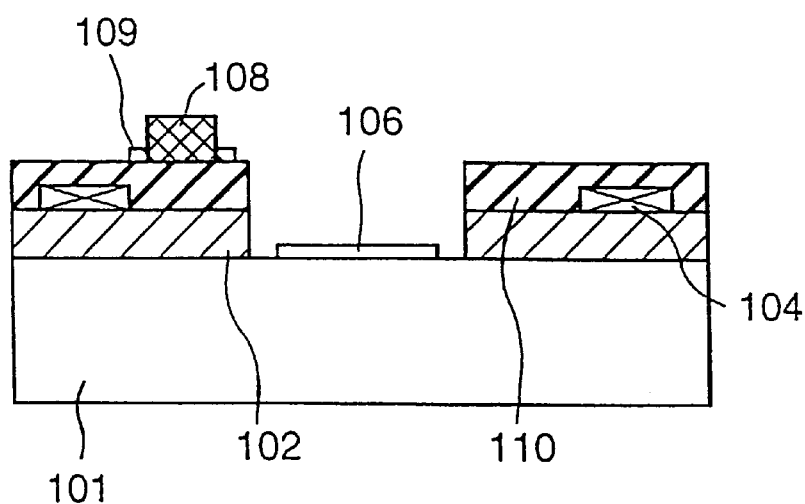

If, as shown in FIGS. 4A and 4B, a Hall element is attached to the motional ends of the movable plate, then a specular surface can be provided on the same side as a coil and the Hall element are provided, as shown in FIG. 5A. FIG. 5B is a sectional view taken along line 5B—5B of FIG. 5A. This structure can be obtained by executing a process obtained by modifying the above-mentioned process. To be specific, when a pattern is formed on an insulating film 102, the insulating film 102 is removed from the area where the specular surface is to be provided. If the metallic film used as the coil 104 has a high reflectivity, such as that of aluminium, gold, or the like, the metallic film is allowed to remain in the specular surface portion at the time of pattern formation. After the insulating film 110 is formed, pattern formation is effected so as to remove that portion of the insulating film which covers the specular surface.

If the metallic film used as the coil has a low reflectivity, such as that of copper, pattern formation is effected so as to remove the insulating films 102 and 110 from the position where a specular surface is to be provided. Subsequently, a metallic film, serving as a specular surface, is formed, and pattern formation is effected. In either case, the surface of the movable plate may be used as a specular surface.

The structure shown in FIGS. 5A and 5B is characterized in that only one side of the movable plate has to be polished. This structure is advantageous in that the movable plate can be made of a low-priced material. In this connection, it should be noted that the structure shown in FIGS. 2A and 2B has to employ a movable plate both sides of which are polished.

Figure 6A:
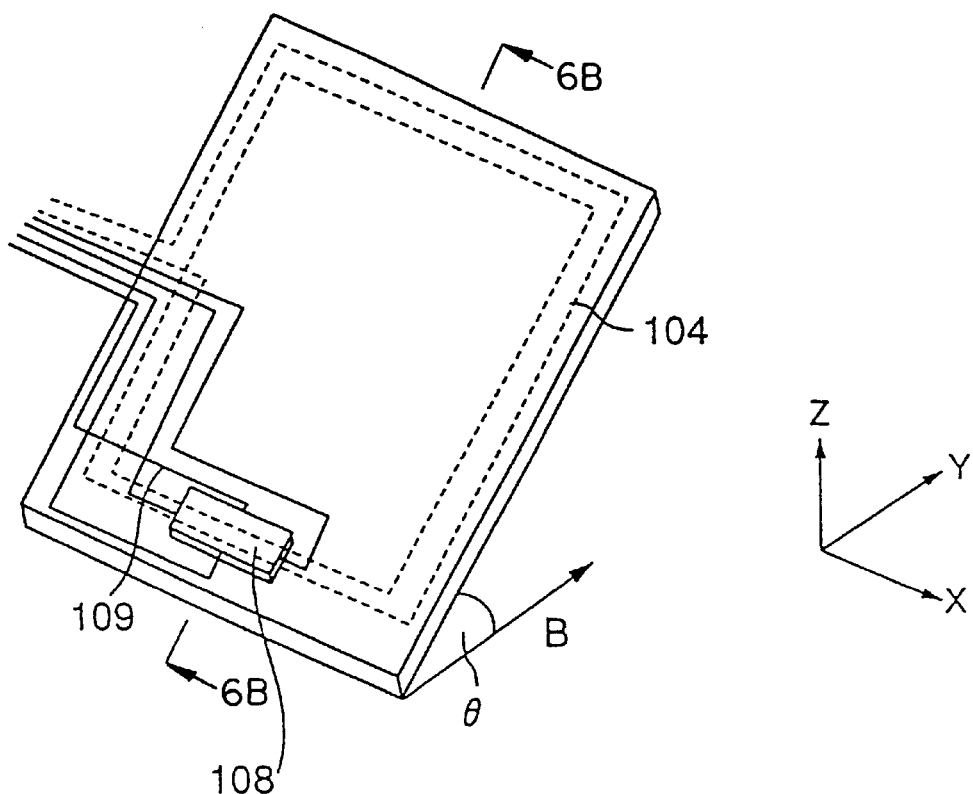
FIGS. 6A and 6B show a modification wherein a Hall element is arranged at a position where the Hall element overlaps in the thickness direction of the movable plate 101 with the region of a driving coil at a motional end of a movable plate.
Figure 6B:
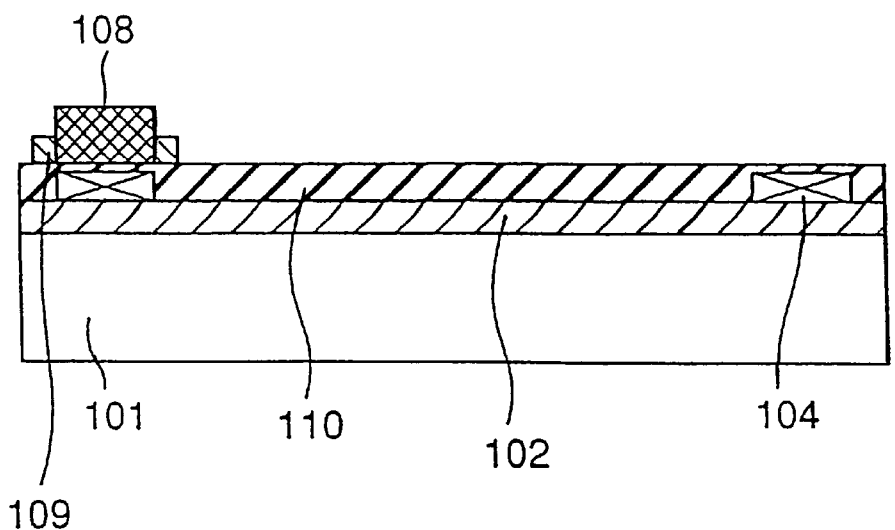

In still another example, as shown in FIGS. 6A and 6B, the Hall element 108 is arranged at a position where the Hall element overlaps in the thickness direction of the movable plate 101 with the region of a driving coil at a motional end of a movable plate. This allows the entire Hall element 108 to be placed closer to the permanent magnet, providing higher sensitivity of detection. In addition, since the Hall element 108 is placed right over the driving coil 104, the magnetic flux density component in the Hall element 108 due to current flow in the driving coil 104 becomes substantially parallel to the movable plate 101, so that no magnetic flux density is produced in the direction of thickness of the Hall element 108. Thus, a Hall voltage due to interaction between the current in the driving coil 104 and the magnetic flux density in the direction of thickness of the Hall element 108 will not be produced. An optical deflector is therefore provided which can prevent unwanted signals from being produced.

Figure 7A:
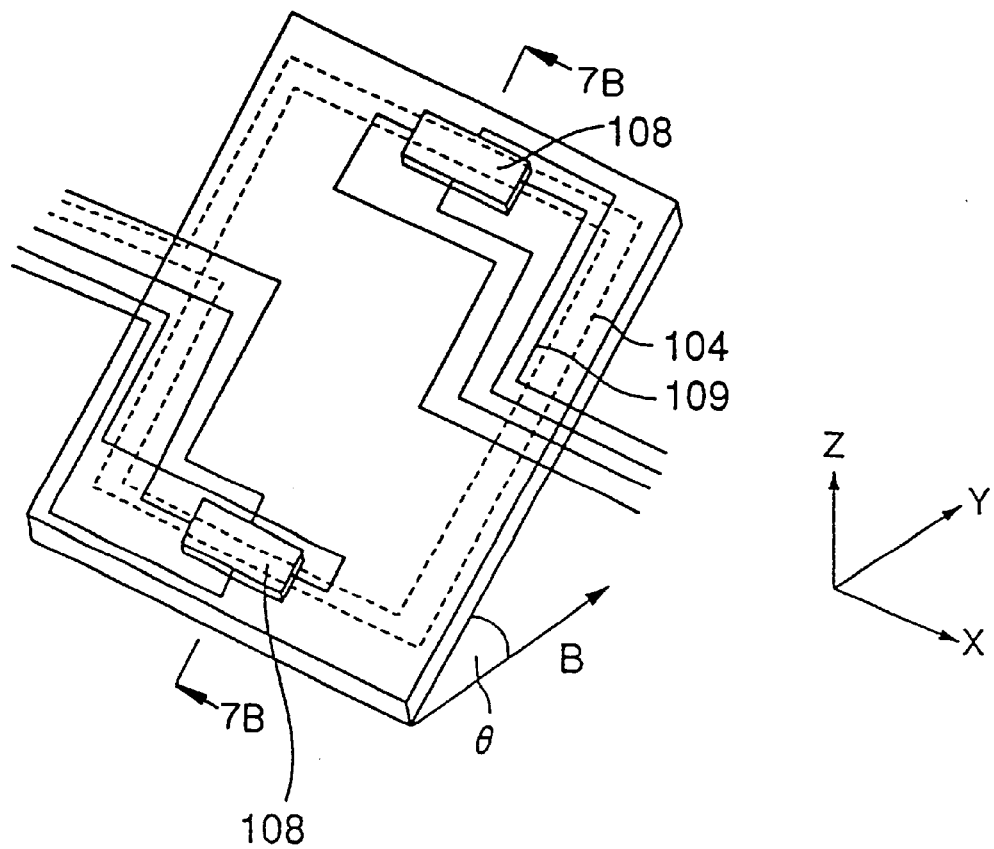
FIGS. 7A and 7B show a modification of the first embodiment in which Hall elements are positioned immediately above the driving coil at both the motional ends of the movable plate.
Figure 7B:
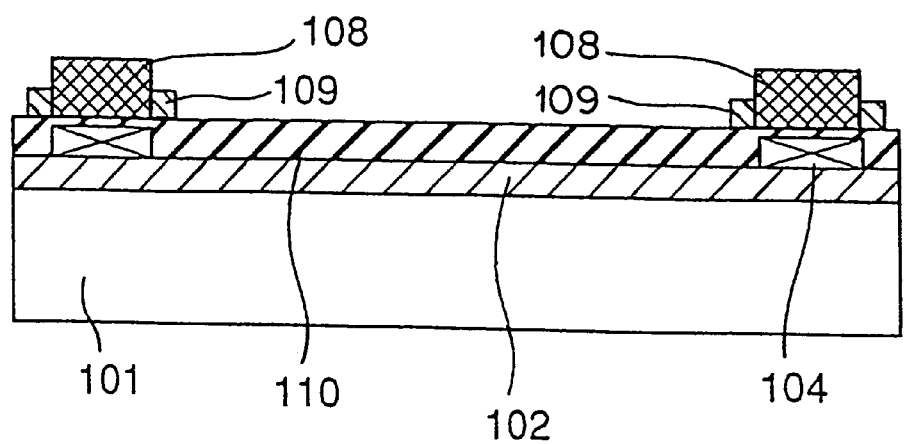

Further, as shown in FIGS. 7A and 7B, two Hall elements 108 may be located right over the driving coil 104 at both the motional ends of the movable plate 101. In that case, the Hall voltages produced in both the Hall elements can be added together to double the detection sensitivity.

Figure 9A:
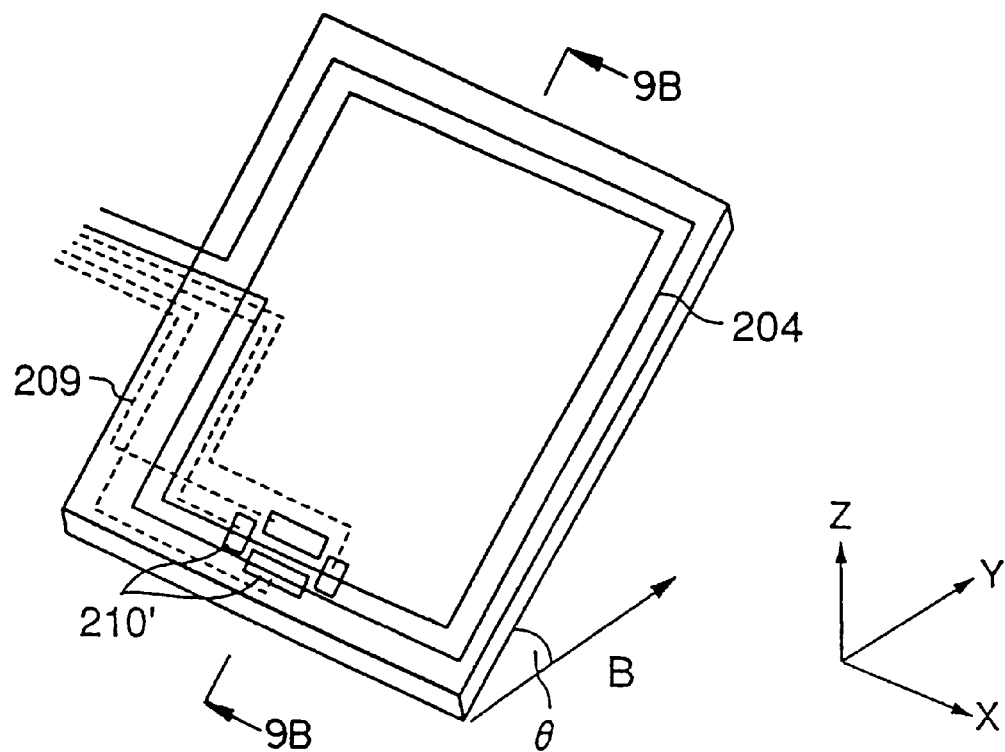
FIGS. 9A and 9B show a modification of the second embodiment in which diffused layers for four-terminal electrode contacts are formed so that a Hall element is positioned immediately below the driving coil.
Figure 9B:
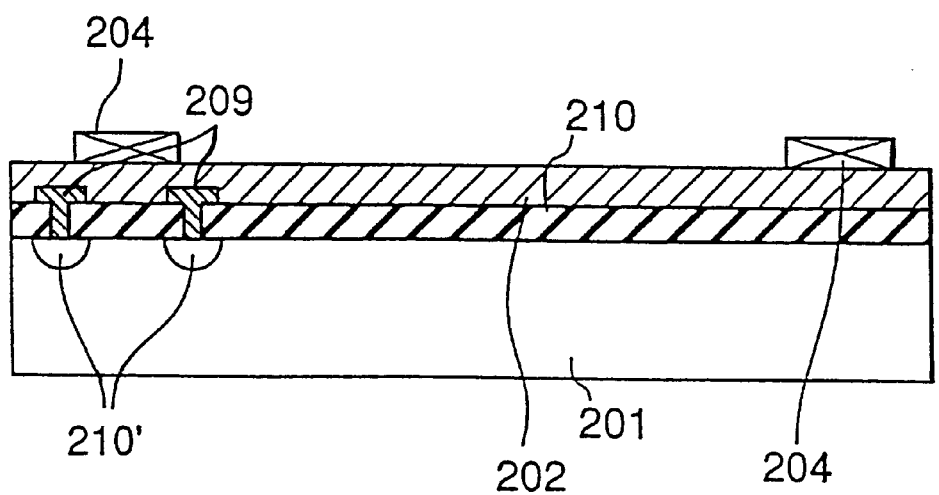
Figure 10:
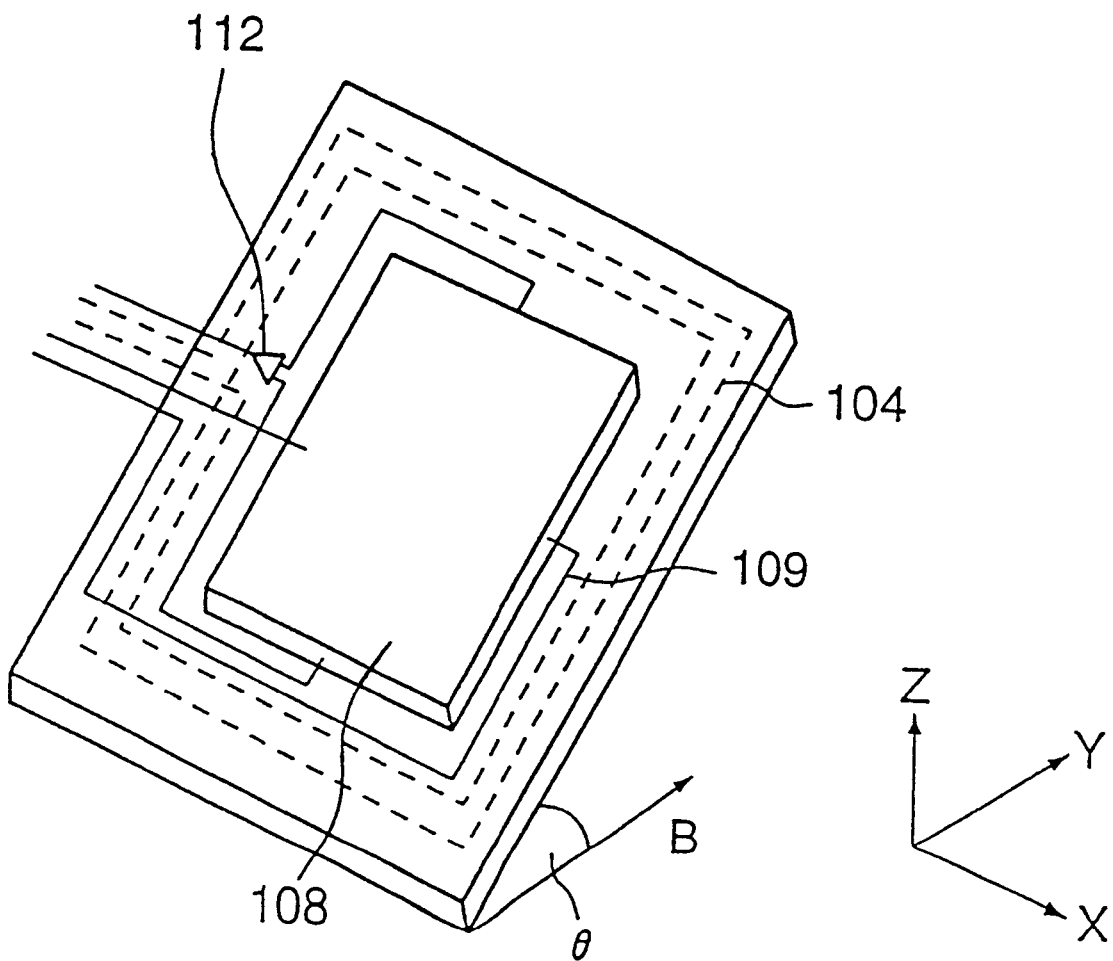
FIG. 10 shows a modification of the second embodiment in which a function of amplifying a Hall voltage is added.

As shown in FIG. 10, an active amplifier 212 in which MOS or bipolar transistors are integrated is formed between Hall element wiring on a movable plate. Thus, a Hall voltage produced is amplified by the amplifier, providing a high-sensitivity optical deflector. Although not shown in the figure, it is possible that the same advantage as that of the construction of FIG. 9 can be obtained by attaching a Hall IC which is the integral element of a Hall element and a signal processing circuit, instead of the Hall element 18.

The first embodiment thus far described allows the implementation of an optical deflector that can detect a position signal with higher accuracy and sensitivity than is possible in the conventional techniques.

Next, a second embodiment of the present invention will be described. This embodiment is characterized in that a movable plate and a Hall element are formed integral with each other in a monolithic form. The second embodiment is illustrated in FIGS. 8A and 8B.

Figure 8A:
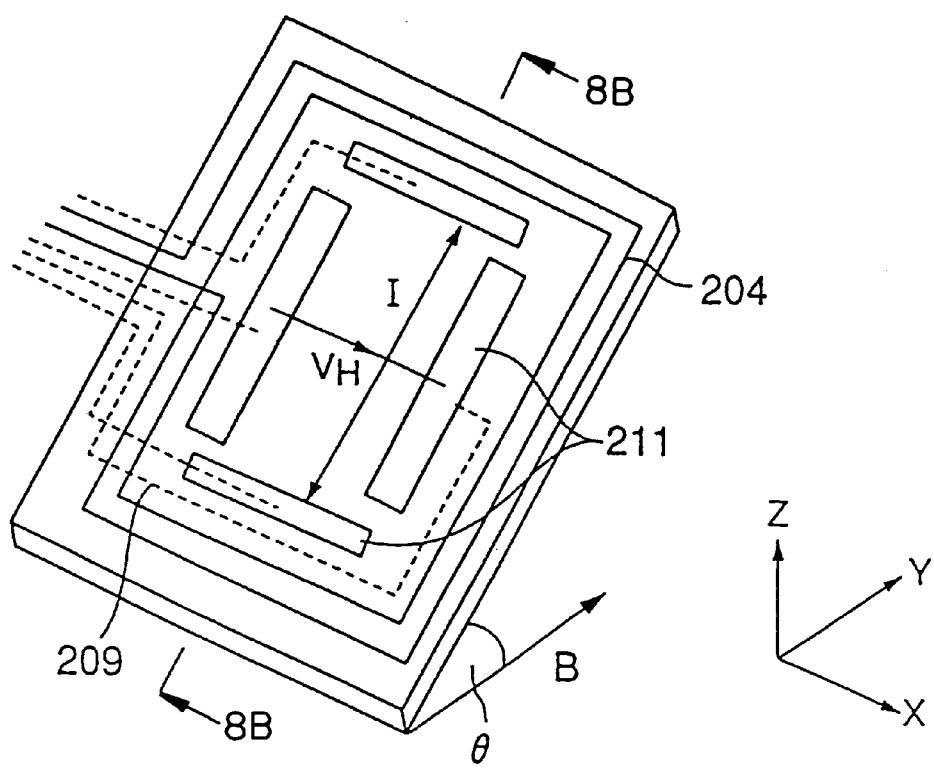
FIG. 8A is a perspective view of the major part of an optical deflector according to a second embodiment of the present invention in which a movable plate and a Hall element are formed integral with each other in a monolithic form.
Figure 8B:
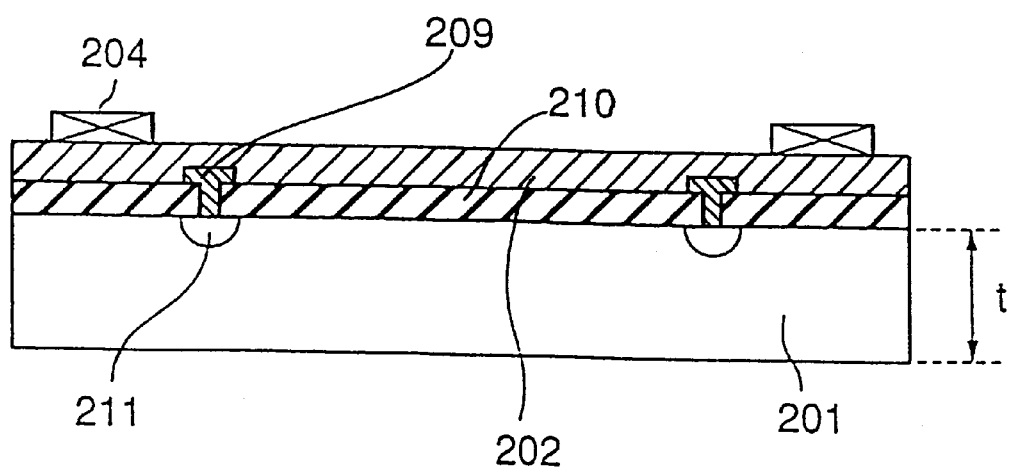
FIG. 8B is a sectional view taken along line 8B—8B of FIG. 8A.

First, as shown in FIGS. 8A and 8B, impurities of high concentration are doped into a movable plate 201 consisting of a semiconductor substrate made of Si, InSb, InAs, GaAs, or the like at an electron concentration as high as $1 \times 10^{20}$ cm$^{-3}$ to $1 \times 10^{22}$ cm$^{-3}$ to form highly doped diffused layers 211 as four-terminal electrode contacts. Afterwards, Hall element wiring 209 are formed by means of sputtering, CVD, vacuum evaporation, or the like above the highly doped diffused layers 211 so that they contact each other through contact holes in an insulating layer 210 interposed therebetween. After that, a driving coil 204 is formed above the highly doped diffused layers 211 and the Hall element wiring 209 with an insulating film 202 serving also as an elastic member interposed therebetween.

Although, in FIG. 8B, the driving coil 204 is shown exposed in the uppermost portion, it may be covered with an insulating film. The area on the inside of the four electrodes on the movable plate 201 forms a semiconductor Hall element.

As shown in FIG. 8A, when a current is applied between the electrodes in the X-direction, a Hall voltage is produced between the electrodes in the Y-direction as in the first embodiment. An optical deflector is thus implemented which can detect a position signal.

As described above, by forming highly doped diffused layers serving as four-terminal electrode contacts through ion implantation into that portion of the movable plate which is located on the inside of the driving coil, a Hall element can be formed integral with the movable plate in a monolithic form. Thus, the optical deflector can be reduced in size and mass-produced with a reduction in the number of manufacturing steps and a reduction in the cost of manufacture.

As shown in FIGS. 9A and 9B, highly doped diffused layers 210' for four-terminal electrode contacts are formed so that a Hall element is located right below the driving coil 204 as in the case of FIG. 6 in the first embodiment. Thus, the entire Hall element becomes closer to the permanent magnet. As a result, the detection sensitivity becomes high and the magnetic flux density due to current flow in the driving coil 204 in the Hall element becomes substantially parallel to the movable plate 201. That is, no magnetic flux density is produced in the direction of thickness. Therefore, no Hall voltage due to interaction between the magnetic flux density in the direction of thickness and the driving coil current is produced, thus implementing an optical deflector which can prevent unwanted signals from being produced.

Although, in FIGS. 9A and 9B, the Hall element is shown located right below the driving coil 204, it may be located right above the driving coil 204 as in the first embodiment. Though not shown, two Hall elements may be located right below or above the driving coil 204 at both the motional ends of the movable plate 201 as in the case of the first embodiment. By so doing, an optical deflector can be implemented which has twice the detection sensitivity.

Although not shown in the figure, it is possible that a position signal of high sensibity can be produced by integrally forming a signal processing circuit for the Hall element on the movable plate. And a mirror surface can be formed on the same surface as that of the coil and the Hall element.

According to the above-described second embodiment, a Hall element and a movable plate can be formed integral with each other in a monolithic form. Thus, the optical deflector can be reduced in size and mass-produced with a reduction in the number of manufacturing steps and a reduction in the cost of manufacture.

Next, a third embodiment of the present invention will be described. This embodiment is characterized in that a movable plate and a Hall element are formed integral with each other in a monolithic form and moreover the thickness of the Hall element is reduced, thereby providing high-sensitivity detecting means. The third embodiment is illustrated in FIGS. 11A and 11B.

Figure 11A:
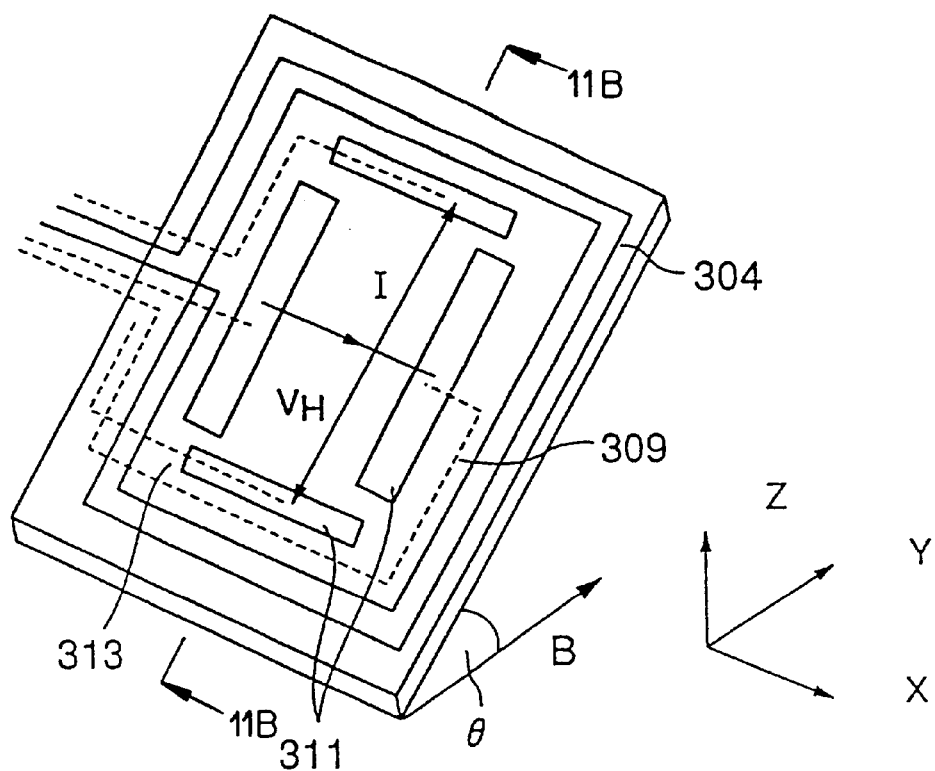
FIG. 11A is a perspective view of the major part of an optical deflector according to a third embodiment of the present invention in which a movable plate and a Hall element are formed integral with each other in a monolithic form and the thickness of the element is reduced to implement high-sensitivity detecting means.
Figure 11B:
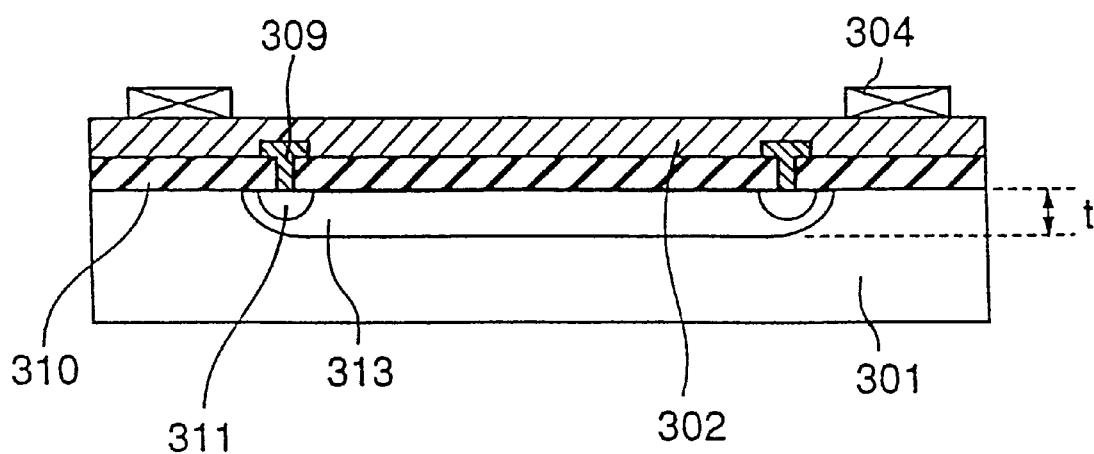
FIG. 11B is a sectional view taken along line 11B—11B of FIG. 11A.

As shown in FIGS. 11A and 11B, a diffused layer 313 is formed in a semiconductor substrate of Si, InSb, InAs, or GaAs, serving as a movable plate 301, by ion-implantation of such impurities as produce carriers of opposite polarity to those in the semiconductor substrate. After that, highly doped diffused layers 311 are formed in the diffused layer 313 by ion implanting impurities at a high dose as in the second embodiment. Next, Hall element wiring 309 are formed above the highly doped diffused layers 311 so that they contact each other through contact holes formed in an insulating layer 310 interposed therebetween. After that, a driving coil 304 is formed above the Hall element wiring 309 with an insulating film 302 serving also as an elastic member interposed therebetween.

Thus, a monolithic Hall element can be formed as in the second embodiment. In this example, the carriers in the impurity diffused layer 313 are opposite in polarity to those in the movable plate substrate; thus, the thickness t of the diffused layer 313 is the thickness of the Hall element. In the second embodiment, the thickness of the Hall element is that of the substrate, of the order of hundreds of micrometers. In the third embodiment, on the other hand, the thickness of the Hall element is of the order of thousands of angstroms. In accordance with equation (1), therefore, the Hall voltage produced in the third embodiment is three orders of magnitude larger than in the second embodiment. Thus, the third embodiment provides an optical deflector equipped with a monolithic Hall element that allows three orders of magnitude increase in the sensitivity.

Figure 12A:
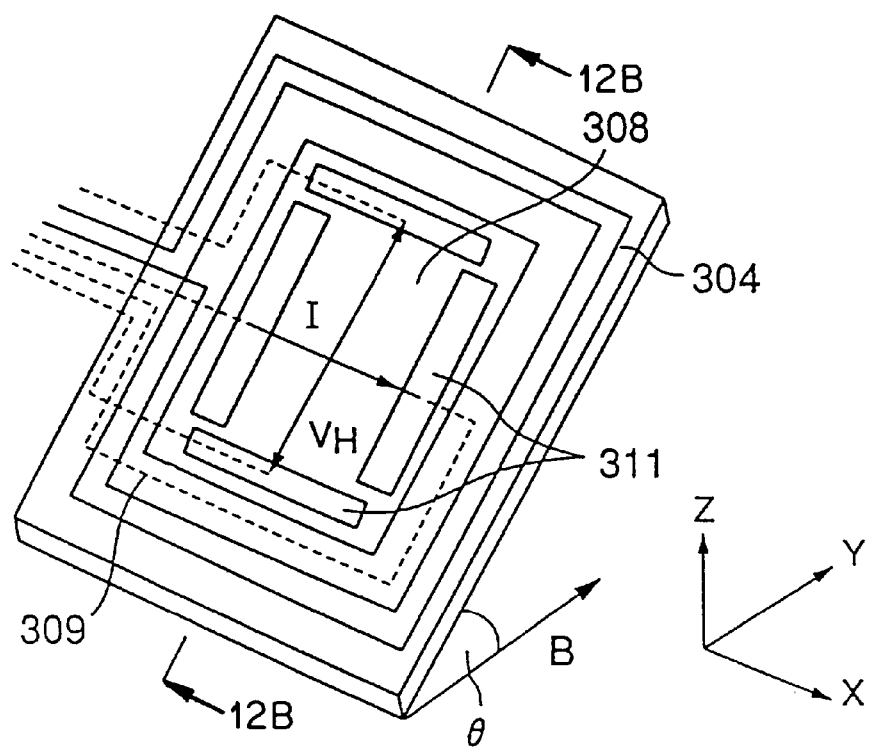
FIGS. 12A and 12B show a modification of the third embodiment in which an insulating film is formed over the entire surface of a movable plate and a Hall element of thin film is formed in the insulating film.
Figure 12B:
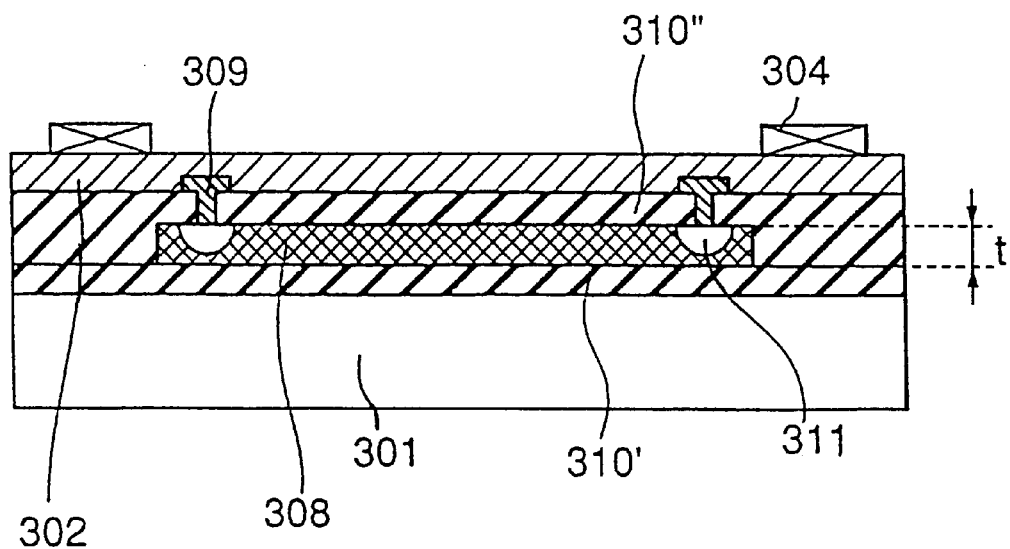
Figure 13A:
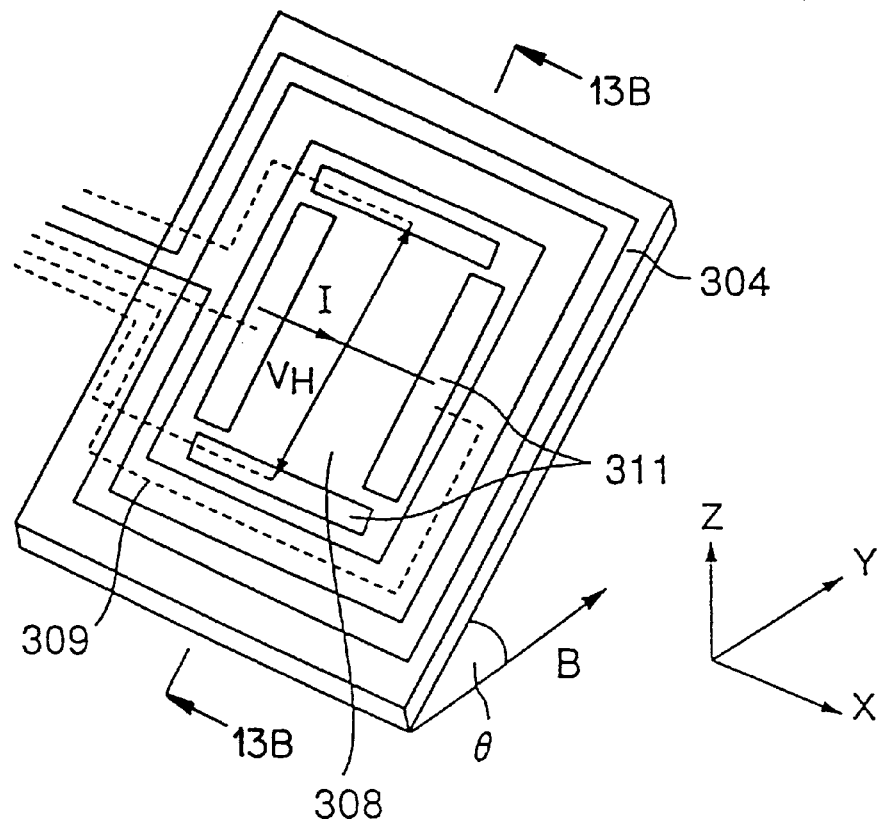
FIGS. 13A and 13B show a modification of the third embodiment in which a polycrystalline semiconductor is formed by means of CVD as a Hall element of thin film.
Figure 13B:
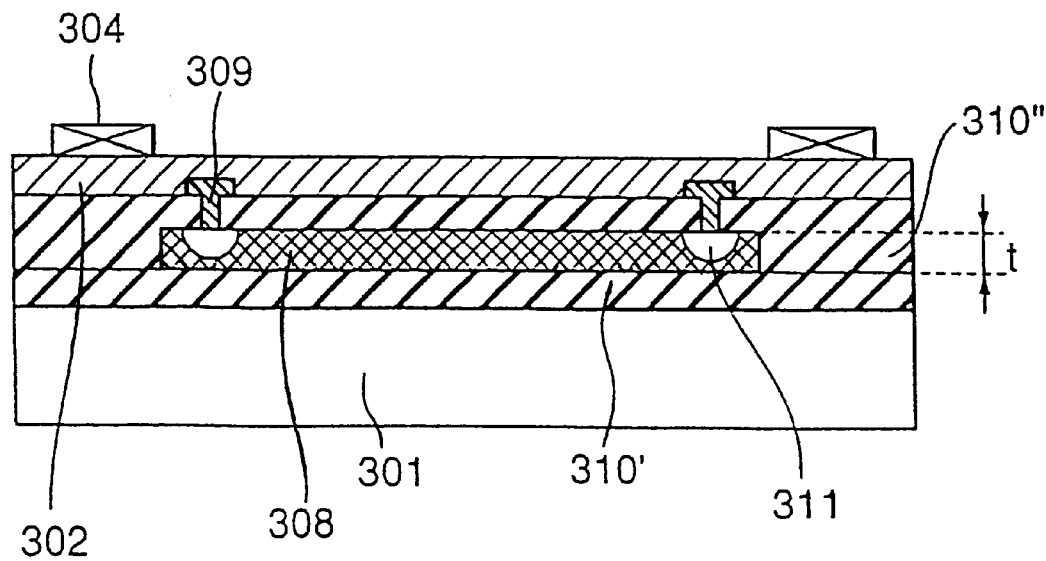
Figure 14A:
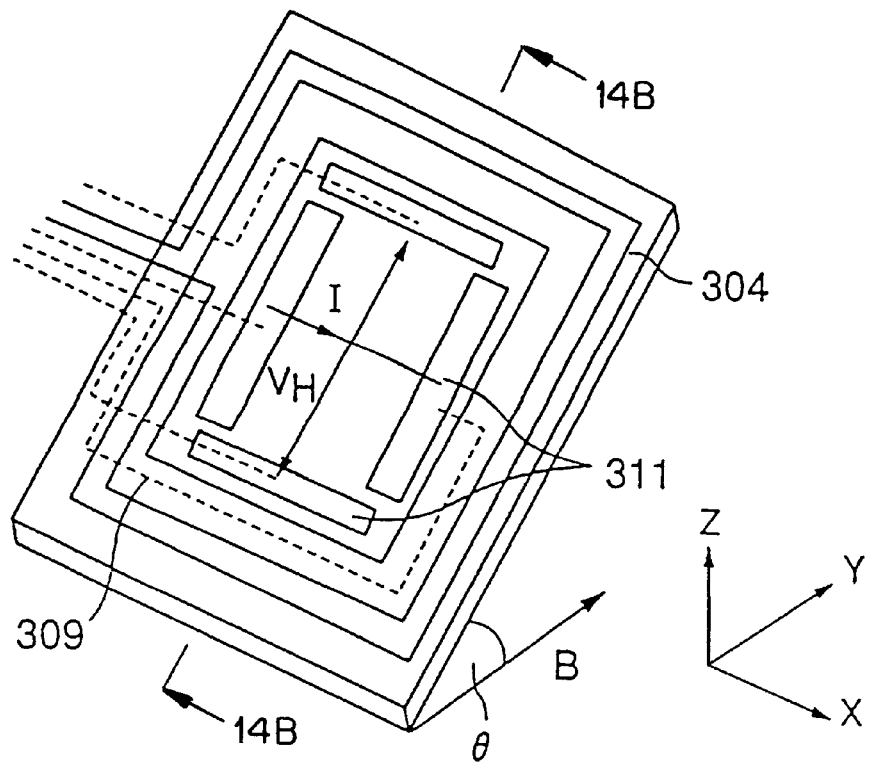
FIGS. 14A and 14B show a modification of the third embodiment in which a movable plate is formed from an SOI substrate and a Hall element is formed in the upper semiconductor layer.
Figure 14B:
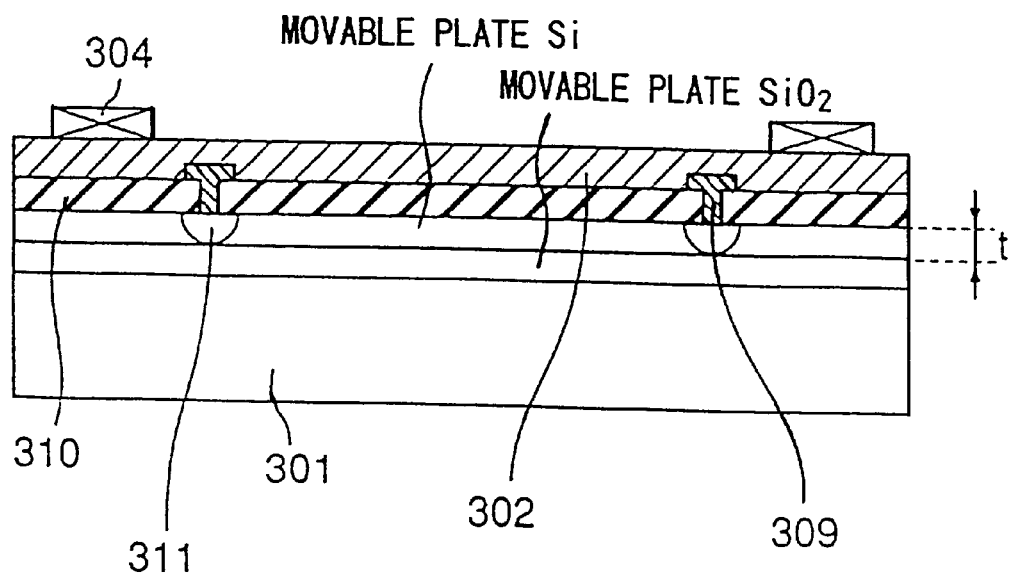

Next, a modification of the third embodiment will be described. As shown in FIGS. 12A and 12B, an insulating film 310' is formed over the entire surface of the movable plate 301. Next, a Hall element 314, such as InSb, InAs, or the like, that has a Hall voltage detection sensitivity is formed by means of vacuum evaporation, sputtering, or the like on the insulating film 310 at a small thickness. After that, as in the second embodiment, heavily doped diffused layers 311 for Hall element electrode contacts are formed in the Hall element 314 by ion implanting impurities at a high dose. The Hall element wiring 309 are then formed above the diffused layers 311 in contact with them through contact holes formed in an insulating film 310" interposed therebetween.

After that, the driving coil 304 is formed on an insulating film 302, serving as the elastic member, that covers the Hall element wiring 309. In this modification, the interposition of the insulating film 310" results in the thickness of the Hall element being equal to the thickness of the semiconductor (InSb, InAs, or the like), implementing a Hall element which is much smaller in thickness than in the second embodiment. Thus, an optical deflector is implemented which can form a monolithic Hall element that has a high position signal detection sensitivity. The movable plate in this example is not limited to a semiconductor material such as Si, GaAs, or the like; it may consist of a high-stiffness material such as a metal, an insulating material, or the like.

Thus, an optical deflector is implemented which is capable of producing a position signal with high sensitivity by forming an insulating film over a movable plate and then forming a Hall element in a monolithic form on the insulating film. Although the embodiment has been described as forming the Hall element of small thickness by means of vacuum evaporation or sputtering, it is also possible to practice an embodiment (FIG. 13) in which a polycrystalline semiconductor, for example, poly-Si, is formed by CVD or an embodiment (FIG. 14) in which the movable plate is formed from an SOI (Silicon on Insulator) substrate and the upper semiconductor layer is formed into a Hall element. With either of these additional embodiments, an optical deflector can be implemented which is capable of producing a position signal with high sensitivity as in the case of the optical deflector shown in FIG. 12. Although, in the embodiments shown in FIGS. 12 and 13, an Si semiconductor is used, GaAs, InSb, or InAs may be used instead.

As in the first and second embodiments, the Hall element may be arranged immediately above or beneath the driving coil, so as to improve the detection sensitivity and suppress the generation of undesirable signals. In addition, a signal processing circuit for the Hall element may be integrally formed with the movable plate.

According to the third embodiment, an optical deflector is implemented which is capable of producing a position signal with high sensitivity by forming a Hall element of small thickness in a monolithic form.

Figure 15:
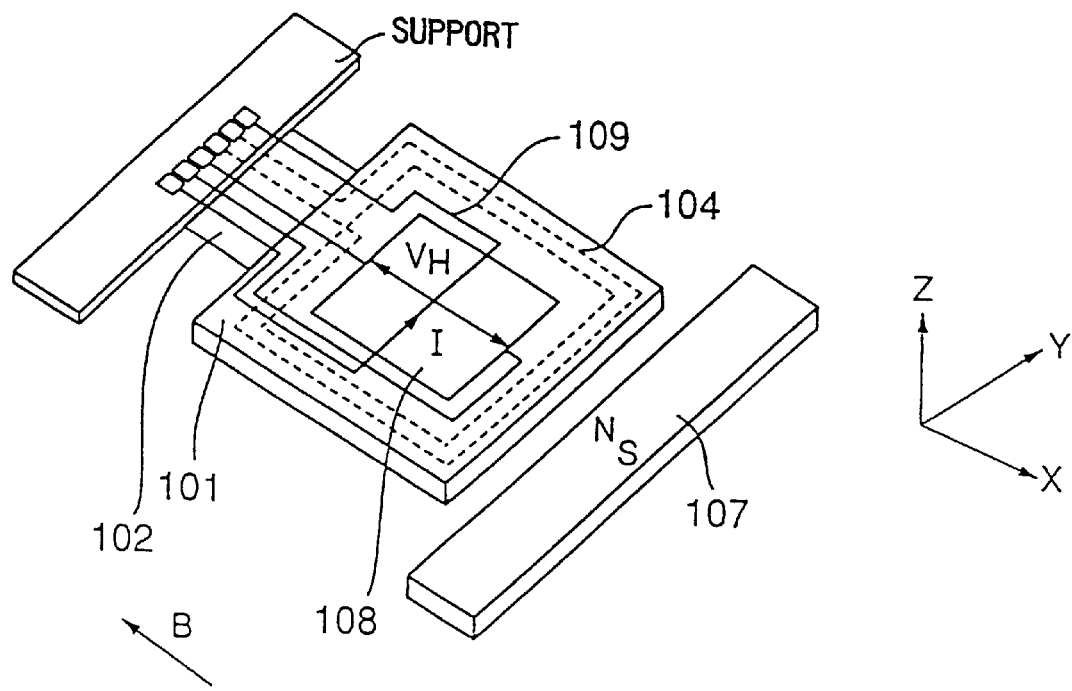
FIG. 15 shows a modification in which the light deflecting mirror has a cantilever structure and a Hall element is attached to a movable plate.
Figure 16:
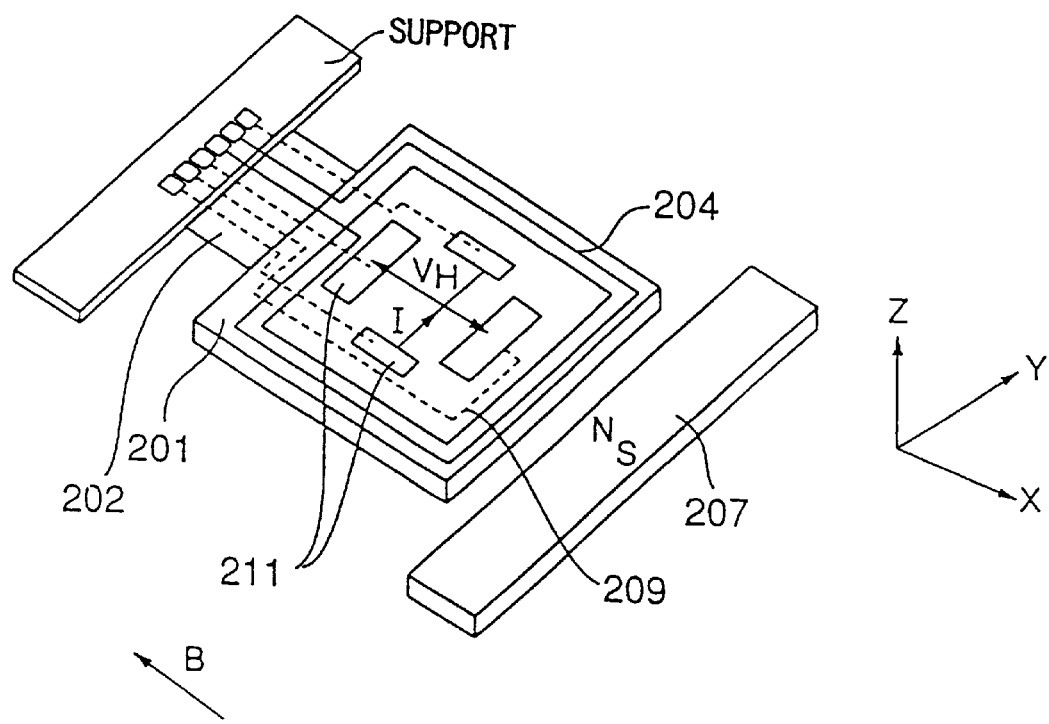
FIG. 16 shows a modification in which the light deflecting mirror has a cantilever structure and a Hall element and a movable plate are formed integral with each other.

Although the first, second and third embodiments were described as the light deflecting mirror supported by a torsion bar structure, a cantilever structure is also applicable to these embodiments as shown in FIGS. 15 and 16. Hereinafter, the workings of the structures of FIGS. 15 and 16 will be described. FIG. 15 shows an optical deflector in which a Hall element is attached to a movable plate as in the first embodiment, and FIG. 16 shows an optical deflector in which a movable plate and a Hall element are formed integral with each other as in the second embodiment.

In FIGS. 15 and 16, when an AC current is applied to the driving coil 104, 204, interaction between the current in the Y-direction in the driving coil and a magnetic field in the X-direction produced from the permanent magnet 107, 207 causes Lorentz force to act on the driving coil in the Z-direction. The Lorentz force allows the movable plate 101, 201 to rotate around the Y-axis with its rotation center being the boundary between the elastic member 102, 202 and the support.

When the movable plate 101, 201 is tilted by angle θ, the magnetic flux density component in the direction of thickness of the Hall element is B sin θ. Thus, even in the cantilever structure, as in the torsion bar structure, a current flow between the Hall element terminals in the X-direction allows a Hall voltage to be produced between the Hall element terminals in the Y-direction, which is represented by $$V_H = R_H \cdot I \cdot B \cdot \sin \theta / t$$

Thus, using the same Hall element and assuming that the applied current I and magnetic flux density B are fixed, the Hall voltage depends on the deflection angle of the movable plate 101, 201 and hence serves as a position signal representing the position of the movable plate. That the detected signal is a position signal allows the position of the movable plate to be detected more accurately than in the conventional technique. Moreover, precise detection is possible even in a static state in which a DC current is applied to the driving coil.

It is possible that the high sensibity can be obtained by forming a thin Hall element under the Hall electrode via the diffusion layer and the insulating film. The same modification as those of the first, second, and third embodiments can be possible in relation to where the Hall element is positioned and the integration of the signal processing circuit.

Next, a fourth embodiment of the present invention will be described. This embodiment is characterized in that the cantilever or gimbal structure is driven in two directions to detect a two-dimensional position signal. The fourth embodiment is illustrated in FIGS. 17 through 20.

Figure 17:
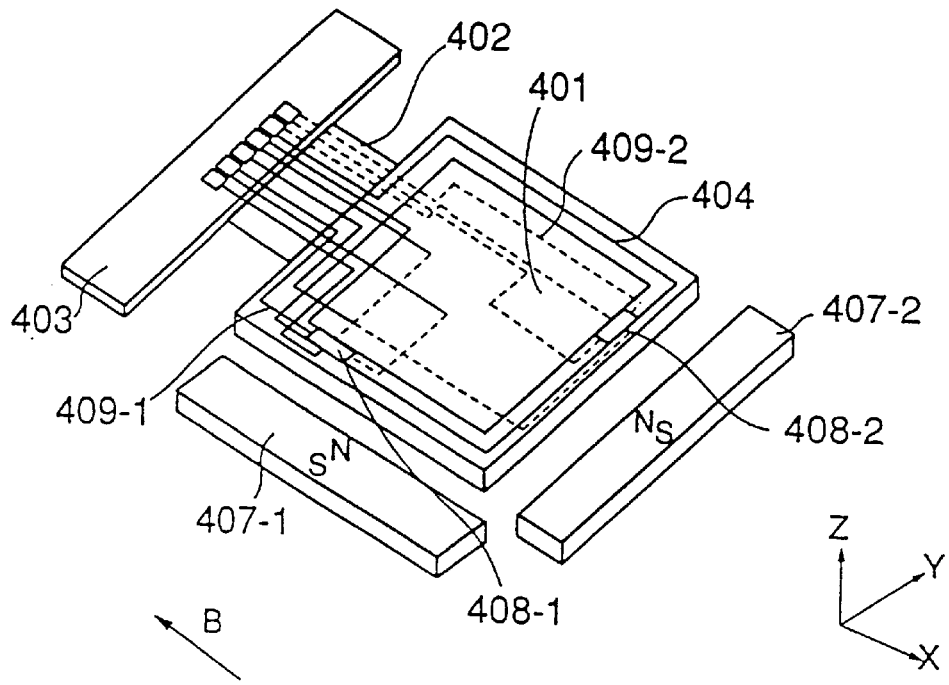
FIG. 17 shows an optical deflector of the cantilever structure in which a Hall element is attached to a movable plate in a fourth embodiment of the present invention.

An optical deflector of the cantilever structure will be described first. As shown in FIG. 17, two permanent magnets 407-1 and 407-2 are placed which are magnetized in the X-direction and the Y-direction, respectively, so that the magnetic flux density is produced in the two directions. Hall elements 408-1 and 408-2 are attached to a movable plate 401 in the vicinity of the permanent magnets 407-1 and 407-2, respectively, and right above a driving coil 404. Hall element wiring 409-1 and 409-2 are also attached to the movable plate in contact with the Hall elements 408-1 and 408-2, respectively.

In the optical deflector thus arranged, when an AC current is applied to the driving coil 404, the X-direction current in the driving coil 404 and a magnetic field in the Y-direction produced by the permanent magnet 407-1 exerts a Lorentz force on the driving coil 404 in the Z-direction. The Y-direction current in the driving coil and a magnetic field in the X-direction produced by the permanent magnet 407-2 exerts a Lorentz force on the driving coil in the Z-direction. These Lorentz forces cause the movable plate 401 to rotate with its rotation center being the X-direction of the elastic member 402 and rotate in the Y-direction with its rotation center being the boundary between the elastic member and a support 403.

When the movable plate 401 is tilted by angle θ by rotation, the magnetic flux density in the direction of thickness of the Hall element 408-1 becomes B·sin θ. On the other hand, when the movable plate 401 is tilted by angle φ by translation, the magnetic flux density in the direction of thickness of the Hall element 408-2 becomes B·sin φ. Thus, when a current is applied between the terminals in one direction of each of the Hall elements 408-1 and 408-2, Hall voltages are produced between the terminals in the other direction of the Hall elements, which are given by $$V_H = R_H \cdot I \cdot B \cdot \sin \theta / t$$

$$V_H = R_H \cdot I \cdot B \cdot \sin \phi / t$$

Thus, using the same Hall element and assuming that the applied current I and the magnetic flux density B are fixed, since the Hall voltages each depend on each deflection angle of the movable plate 401, a deflection angle of two degrees of freedom can be detected by detecting the voltage signal of the each Hall element. As in the first embodiment, the Hall elements 408-1 and 408-2 are placed in the vicinity of the motional ends of the movable plate 401 and right above the driving coil. As a result, the magnetic flux density due to current flow in the driving coil 404 in the Hall elements becomes substantially parallel to the movable plate 401. That is, no magnetic flux density is produced in the direction of thickness. Therefore, no Hall voltage due to interaction between the magnetic flux density in the direction of thickness and the driving coil 404 current is produced, allowing the implementation of an optical deflector capable of preventing unwanted signals from being produced.

It is desirable that the Hall element 408-1 be placed at a distance from the permanent magnet 407-2 so that it is little subjected to the magnetic flux density in the X-direction produced by the permanent magnet 407-2. Likewise, the Hall element 408-2 should also be placed at a distance from the permanent magnet 407-1.

Figure 18:
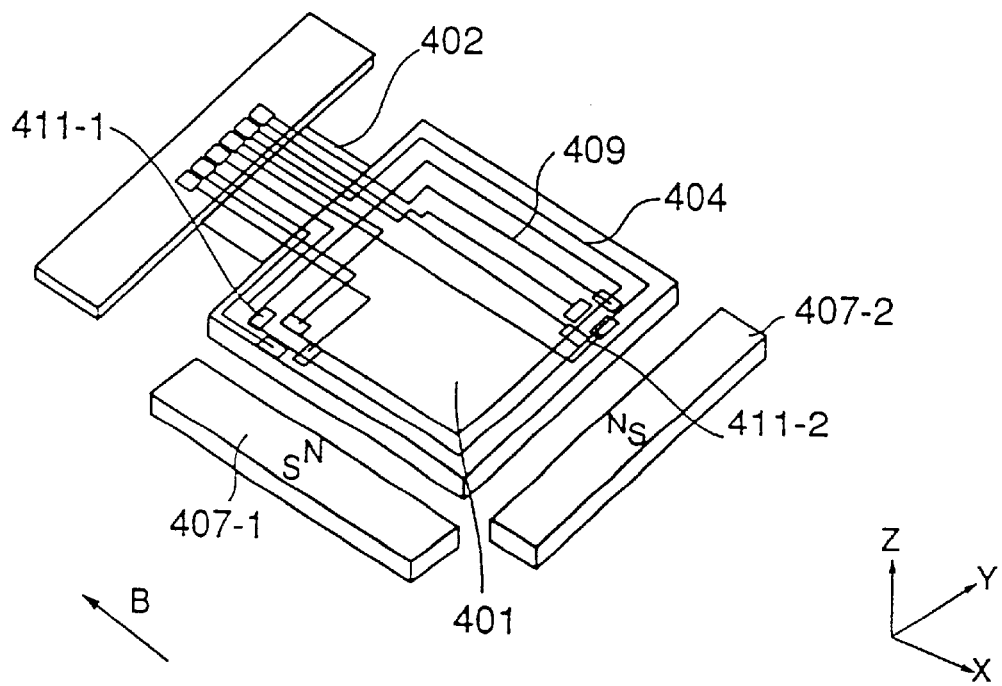
FIG. 18 shows an optical deflector of the cantilever structure in which a Hall element and a movable plate are formed integral with each other by forming diffused layers through ion implantation.

Although the optical deflector of FIG. 17 is arranged such that the Hall elements are attached to the movable plate as in the first embodiment, the Hall elements and the movable plate can be formed integral with each other as in the second embodiment by forming highly doped diffused layers 411-1 and 411-2 through ion implantation as shown in FIG. 18. Though not shown, a Hall element of reduced thickness may be formed through a diffused layer or insulating film below Hall electrodes as in the third embodiment.

Figure 19:
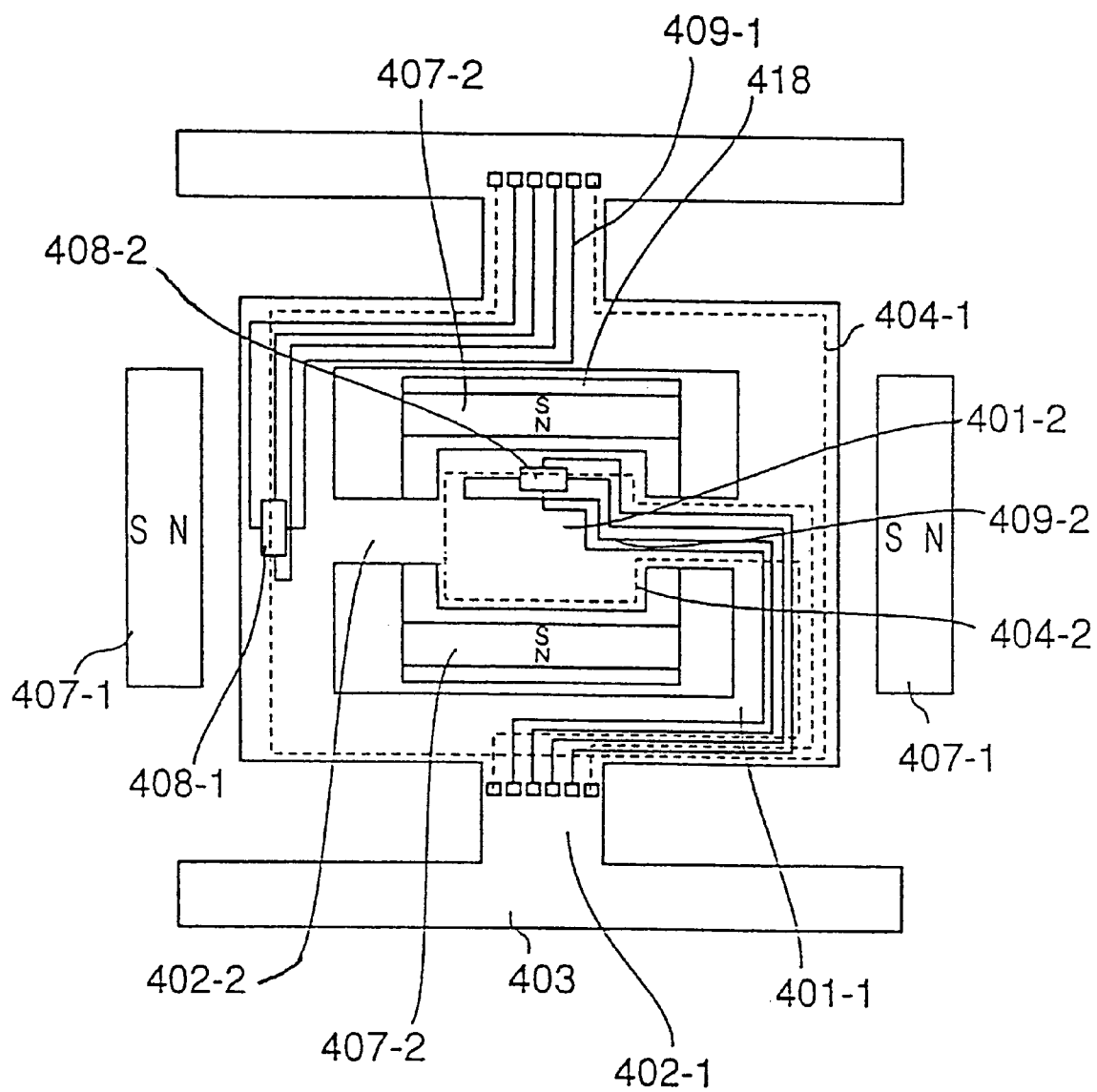
FIG. 19 shows an optical deflector of the gimbal structure in which a Hall element is attached to a movable plate.

Next, an optical deflector of the gimbal structure will be described. As shown in FIG. 19, permanent magnets 407-1 and 407-2 are placed which are magnetized so that the magnetic flux density is produced in the X- and the Y-direction. Hall elements 408-1 and 408-2 are respectively attached to movable plates 401-1 and 401-2 in the vicinity of the permanent magnets 407-1 and 407-2, respectively, and immediately above driving coils 404-1 and 404-2 of the movable plates 401-1 and 401-2. Hall element wiring 409-1 and 409-2 are also attached to the movable plates 401-1 and 401-2 in contact with the Hall elements 408-1 and 408-2, respectively. In order for the Hall element wiring 409-1 not to be subjected to the magnetic flux density from the permanent magnet 407-2, a yoke 418 is provided which connects together those magnetic poles of the respective permanent magnets 407-2 which are not opposite the movable plate 401-2. Though not shown, a yoke may be provided which connects together those magnetic poles of the respective permanent magnets 407-1 which are not opposite the movable plate 401-1.

When an AC current is applied to the driving coils 404-1 and 404-2 in the optical deflector thus arranged, the X-direction current in the driving coil 404-1 and the Y-direction magnetic field from the permanent magnet 407-1 exerts a Lorentz force on the driving coil 404-1 in the direction of thickness of the movable plate 401-1. The Y-direction current in the driving coil 404-2 and the X-direction magnetic field from the permanent magnet 407-2 exerts a Lorentz force on the driving coil 404-2 in the direction of thickness of the movable plate 401-2. As a result, the movable plate 401-1 rotates with its rotation center being the X-direction of the elastic member 402-1, while the movable plate 401-2 rotates with its rotation center being the Y-direction of the elastic member 402-2.

When the movable plate 401-1 is rotated by angle θ, the magnetic flux density in the direction of thickness of the semiconductor layer of the Hall element 408-1 becomes B·sin θ. When the movable plate 401-2 is rotated by angle φ, the magnetic flux density component in the direction of thickness of the semiconductor layer of the Hall element 408-2 becomes B·sin φ. Thus, when a current is applied between the terminals in one direction of each of the Hall elements 408-1 and 408-2, Hall voltages are produced between the terminals in the other direction of the Hall elements, which are given by $$V_H = R_H \cdot I \cdot B \cdot \sin \theta / t$$

$$V_H = R_H \cdot I \cdot B \cdot \sin \phi / t$$

Thus, using the same Hall element and assuming that the applied current I and the magnetic flux density B are fixed, each Hall voltage depends on the deflection angle of the motion of the corresponding movable plate and hence serve as a position signal representing the position of the corresponding movable plate. In the third embodiment, as in the first embodiment, the Hall elements 408-1 and 408-2 are respectively placed in the vicinity of the motional ends of the movable plates 401-1 and 401-2 and right above the driving coils 404-1 and 404-2. As a result, the magnetic flux density due to current flow in the driving coils 404-1 and 404-2 in the Hall elements 408-1 and 408-2 becomes substantially parallel to the movable plates 401-1 and 401-2. That is, no magnetic flux density is produced in the direction of thickness. Therefore, no Hall voltage due to interaction between the magnetic flux density in the direction of thickness and the driving coil current is produced, allowing the implementation of an optical deflector capable of preventing unwanted signals from being produced.

Figure 20:
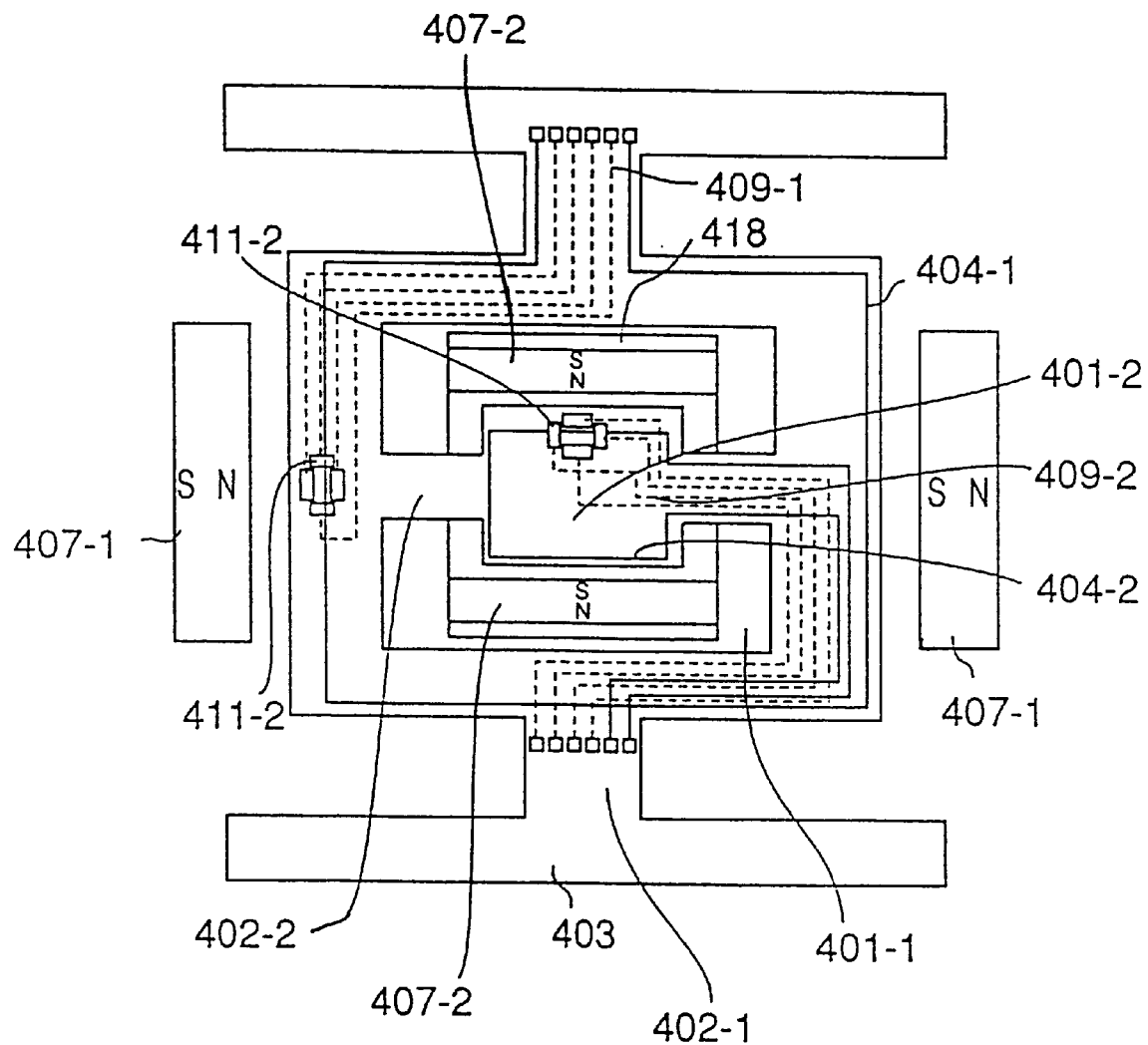
FIG. 20 shows an optical deflector of the gimbal structure in which a Hall element and a movable plate are formed integral with each other by forming diffused layers through ion implantation.
Figure 21A:
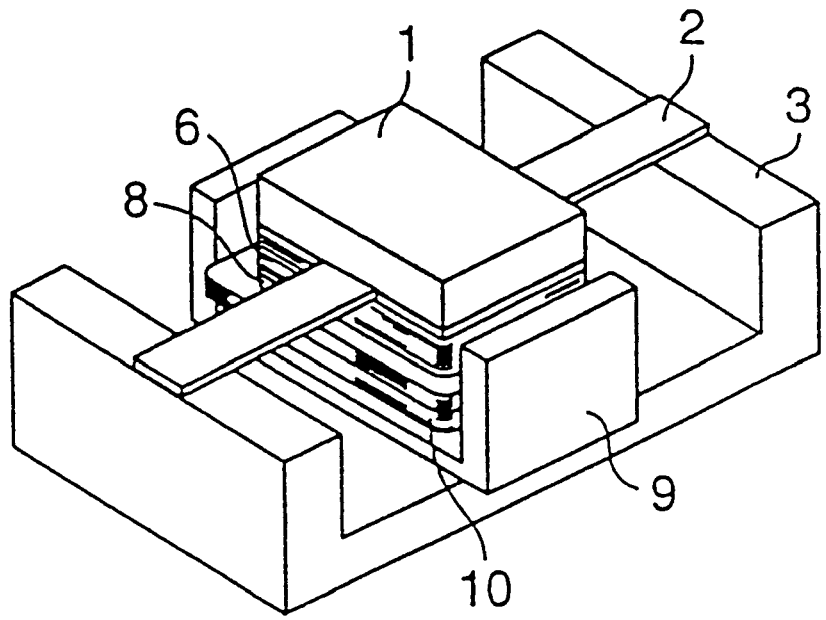
FIGS. 21A and 21B show an example of a conventional optical deflector.
Figure 21B:
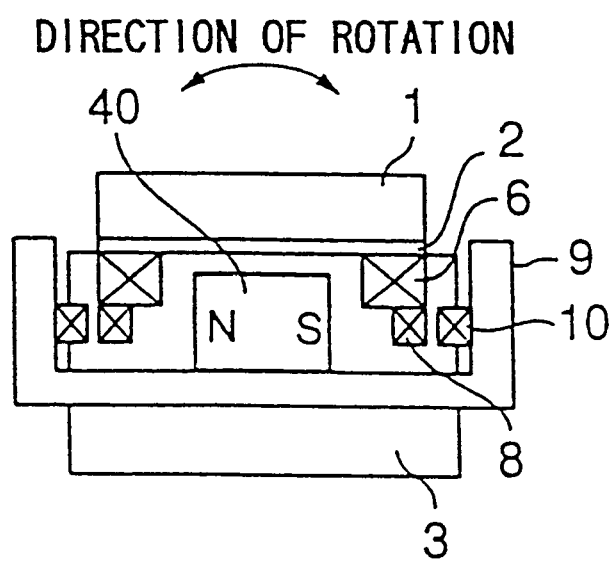
Figure 22:
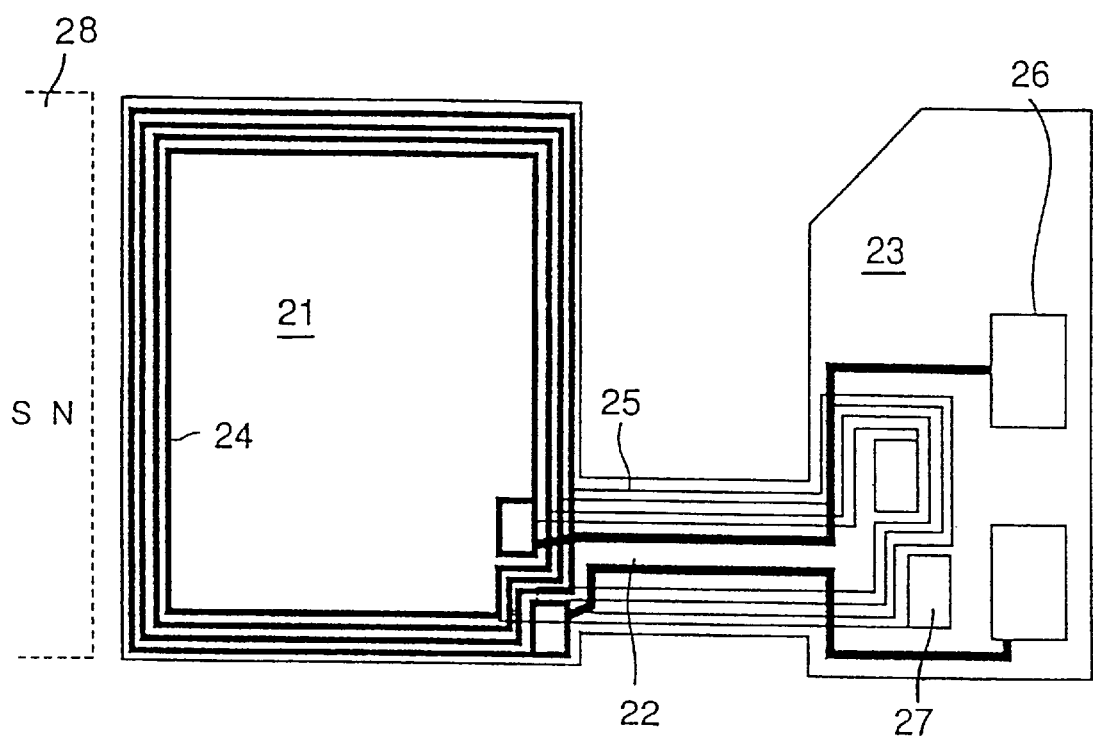
FIG. 22 shows another example of a conventional optical deflector.

Although the optical deflector of FIG. 19 is configured such that the Hall elements are attached to the movable plates as in the first embodiment, the Hall elements and the movable plate can be formed integral with each other as in the second embodiment by forming highly doped diffused layers 411-1 and 411-2 through ion implantation as shown in FIG. 20. Though not shown, a Hall element of reduced thickness may be formed below Hall electrodes through the use of a diffused layer or insulating film as in the third embodiment.

Further, the same modification as those of the first, second, and third embodiments can be possible in relation to when the Hall element is positioned and the integration of the signal processing circuit.

The fourth embodiment allows two-dimensional driving by using the cantilever or gimbal structure and producing the magnetic flux density in two directions, thus providing an optical deflector capable of detecting a two-dimensional position signal.

The embodiments thus far described contain the following inventions:

(1) An optical deflector comprising:

a support;

a movable plate formed with a mirror for reflecting light from a light source, the mirror being formed on at least one surface of the movable plate;

an elastic member coupling the movable plate and the support and holding the movable plate so that it can deflect;

a driving coil formed on at least one surface of the movable plate;

magnetic field producing means for producing a magnetic field in a direction substantially parallel to the surface of the movable plate; and a Hall element for detecting the deflection angle of the deflection motion of the movable plate which occurs when interaction between a current in the driving coil and a magnetic field produced by the magnetic field producing means causes elastic deformation of the elastic member.

With this optical deflector, the provision of the Hall element allows a position signal to be obtained as a detected signal, allowing the position of the movable plate to be detected more precisely than in the conventional techniques. In addition, even when the optical deflector is driven by a low-frequency signal or DC signal, the position of the movable plate can be detected precisely. This invention corresponds to the first through fourth embodiments.

(2) The optical deflector according to (1), wherein the Hall element and a signal processing circuit for the Hall element are provided on the movable plate.

With this optical deflector, the provision of the signal processing circuit having an amplifying or differential function on the movable plate allows a small signal from the Hall element to be amplified or unwanted signals occurring even in the absence of a magnetic field or current applied to be eliminated. Thus, an optical deflector capable of detecting the position of the movable plate with high sensitivity can be implemented. This invention corresponds to the first through fourth embodiments.

(3) The optical deflector according to (1) or (2), further comprising a Hall IC having the Hall element and a signal processing circuit for the Hall element integrally incorporated in.

With this optical deflector, the provision of the Hall IC in which a Hall element and a signal processing circuit having an amplifying or differential function are integrally incorporated on the movable plate allows a small signal from the Hall element to be amplified or unwanted signals occurring even in the absence of a magnetic field or current applied to be eliminated. Thus, an optical deflector capable of detecting the position of the movable plate with high sensitivity can be implemented. This invention corresponds to the first through fourth embodiments.

(4) The optical deflector according to any one of (1) to (3), wherein the Hall element is plural at least one of which is provided in the vicinity of one of motional ends of the movable plate that is deflection-moved.

With this optical deflector, the Hall element, being provided in the vicinity of a motional end of the movable plate that is deflection-moved, is subjected to large magnetic flux density, which results in a detected signal being large in magnitude. Thus, an optical deflector capable of detecting the position of the movable plate with precision is implemented. This invention corresponds to the first through fourth embodiments.

(5) The optical deflector according to any one of (1) to (4), wherein at least one of the Hall element is provided at a position where it overlaps with the region of the driving coil in a thickness direction of the movable plate.

With this optical deflector, since the Hall element is provided at a position where it overlaps with the region of the driving coil in a thickness direction of the movable plate, the magnetic flux density in the Hall element becomes large and unwanted signals which are generated due to the interaction with magnetic field generated by the current in the driving coil, are prevented from being produced. This invention corresponds to the first through fourth embodiments.

(6) The optical deflector according to any one of (1) to (5), wherein the Hall element and the movable plate are formed integral with each other in a monolithic form.

With this optical deflector, the Hall element and the movable plate are formed integral with each other in a monolithic form, allowing a reduction in size and mass production. Moreover, the optical deflector can be manufactured with the reduced number of manufacturing steps. This invention corresponds to the second, third, and fourth embodiments.

(7) The optical deflector according to (6), wherein the movable plate is formed from a semiconductor material, four-terminal electrodes are formed on the movable plate, and that area of the movable plate which are surrounded with the four-terminal electrodes is used as the Hall element.

With this optical deflector, four-terminal electrodes are formed on the movable plate and the area of the movable plate surrounded with the four-terminal electrodes is used as a Hall element. This configuration allows the Hall element and the movable plate to be formed integral with each other in a monolithic form. This invention corresponds to the second, third, and fourth embodiments.

(8) The optical deflector according to (6) or (7), further comprising a Hall IC in which the Hall element and a signal processing circuit for the Hall element are formed integral with each other in a monolithic form.

With this optical deflector, the provision of the Hall IC in which a Hall element and a signal processing circuit having an amplifying or differential function are integrally incorporated on the movable plate allows a small signal from the Hall element to be amplified or unwanted signals occurring even in the absence of a magnetic field or current applied to be eliminated. Thus, an optical deflector capable of detecting the position of the movable plate with high sensitivity can be implemented. This invention corresponds to the second, third and fourth embodiments.

(9) The optical deflector according to any one of (6), (7), and (8), wherein the movable plate is formed from a semiconductor material, and a diffused layer is formed at the upper part of the movable plate through ion implantation using carriers that are opposite in polarity to those in the movable plate, the diffused layer being used as the Hall element.

With this optical deflector, a diffused layer is formed at the upper part of the movable plate by such ion implantation as produces carriers opposite in polarity to those in the movable plate and the resulting diffused layer is used as the Hall element. Since the thickness of the diffused layer-based Hall element is orders of magnitude smaller than that of the substrate, the magnitude of the detected signal increases by orders of magnitude, allowing the implementation of a high-sensitivity optical deflector element. This invention corresponds to the third and fourth embodiments.

(10) The optical deflector according to any of one (6), (7) and (8), wherein an insulating film is formed at the upper part of the movable plate and the Hall element is integrally formed on the upper part of insulating film in a monolithic form.

With this optical deflector, an insulating film is formed at the upper part of the movable plate and the Hall element is formed integral with the upper part of the insulating film in a monolithic form. Thus, the Hall element becomes reduced in thickness, allowing the implementation of a high-sensitivity optical deflector element. This invention corresponds to the third and fourth embodiments.

(11) The optical deflector according to any one of (1) through (10), wherein the movable plate is subjected to magnetic fields in two directions substantially parallel to its surface to provide two-dimensional deflection motion and at least two Hall elements are provided on the movable plate to detect a deflection angle of the movable plate.

With this optical deflector, when the magnetic flux density is applied in two directions substantially parallel to the light deflecting mirror of the cantilever or gimbal structure, the movable plate deflects two-dimensionally. The provision of at least two Hall elements in the vicinity of motional ends of the movable plate allows two-dimensional position signals to be obtained which correspond to the rotation and translation of the movable plate, respectively. This invention corresponds to the fourth embodiment.

According to the present invention, the position of the movable plate can be detected more precisely and with higher sensitivity than in the conventional techniques and moreover, even in the case of driving with a low frequency signal or DC signal, the position of the movable plate can be detected precisely.

What is claimed is:

1. An optical deflector comprising:
   a support;
   a movable plate provided with a mirror for reflecting light from a light source, the mirror being formed on at least one surface of the movable plate;
   an elastic member coupling the movable plate and the support and holding the movable plate so that the movable plate can deflect;
   a driving coil formed on at least one surface of the movable plate;
   magnetic field producing means for producing a magnetic field in a direction substantially parallel to the surface of the movable plate; and
   at least one Hall element for detecting a deflection angle of the movable plate which occurs when interaction between a current in the driving coil and a magnetic field produced by the magnetic field producing means causes elastic deformation of the elastic member;
   wherein the at least one Hall element is provided on the movable plate.

2. The optical deflector according to claim 1, wherein, in addition to the at least one Hall element, a signal processing circuit for the at least one Hall element is also provided on the movable plate.

3. The optical deflector according to claim 1, wherein the at least one Hall element and a signal processing circuit for the at least one Hall element are integrally incorporated in a Hall IC.

4. The optical deflector according to claim 1, wherein at least one of the at least one Hall element is provided in a vicinity of one of motional ends of the movable plate that can be deflected.

5. The optical deflector according to claim 1, wherein at least one of the at least one Hall element is provided at a position overlapping with a region of the driving coil in a thickness direction of the movable plate.

6. The optical deflector according to claim 1, wherein the at least one Hall element and the movable plate are formed integral with each other in a monolithic form.

7. The optical deflector according to claim 6, wherein the movable plate is formed from a semiconductor material, and four-terminal electrodes are formed on the movable plate, and wherein an area of the movable plate which is surrounded by the four-terminal electrodes is used as the at least one Hall element.

8. The optical deflector according to claim 6, wherein the at least one Hall element and a signal processing circuit for the at least one Hall element are formed integral with each other in a monolithic form in a Hall IC.

9. The optical deflector according to claim 6, wherein the movable plate is formed from a semiconductor material, and a diffused layer is formed at an upper part of the movable plate through ion implantation using carriers that are opposite in polarity to carriers in the movable plate, and wherein the diffused layer is used as the at least one Hall element.

10. The optical deflector according to claim 6, wherein an insulating film is formed at an upper part of the movable plate, and the at least one Hall element is integrally formed on the upper part of the insulating film in a monolithic form.

11. The optical deflector according to claim 1, wherein the movable plate is subjected to magnetic fields in two directions substantially parallel to a surface of the movable plate to provide two-dimensional deflection motion, and wherein the at least one Hall element comprises at least two Hall elements provided on the movable plate to detect the deflection angle of the movable plate.

* * * * *